US011498421B2

(12) United States Patent
Son et al.

(10) Patent No.: US 11,498,421 B2
(45) Date of Patent: Nov. 15, 2022

(54) DISPLAY DEVICE FOR VEHICLE

(71) Applicant: LG Electronics Inc., Seoul (KR)

(72) Inventors: Sang-Hyeun Son, Incheon (KR);
Seunghwan Song, Seoul (KR); Romain Diboine, Seoul (KR)

(73) Assignee: LG Electronics Inc., Seoul (KR)

( * ) Notice: Subject to any disclaimer, the term of this patent is extended or adjusted under 35 U.S.C. 154(b) by 318 days.

(21) Appl. No.: 16/872,563

(22) Filed: May 12, 2020

(65) Prior Publication Data

US 2021/0213830 A1    Jul. 15, 2021

(30) Foreign Application Priority Data

Jan. 10, 2020    (KR) .................. 10-2020-0003555

(51) Int. Cl.
*B60K 35/00*    (2006.01)
*B60K 37/02*    (2006.01)
(Continued)

(52) U.S. Cl.
CPC .............. *B60K 35/00* (2013.01); *B60K 37/02* (2013.01); *G09F 9/301* (2013.01); *B60K 37/04* (2013.01);
(Continued)

(58) Field of Classification Search
CPC .............................. B60K 35/00; B60K 37/02; B60K 2370/1533; B60K 2370/67; B60K 37/04; B60K 37/06; B60K 2370/52; B60K 2370/816; G06F 1/1652; G09F 9/301; G09F 11/02; G09F 11/08; G09F 21/049;
(Continued)

(56) References Cited

U.S. PATENT DOCUMENTS 3,646,752 A  *  3/1972  Kampfer ................. F16G 13/12
                                                    198/852
7,291,953 B1 * 11/2007  Smith .................... H02K 41/03
                                                    310/191
(Continued)

FOREIGN PATENT DOCUMENTS

EP    1637387    3/2006
EP    3088986    11/2016
(Continued)

OTHER PUBLICATIONS

Office Action in Korean Appln. No. 10-2020-0003555, dated Jun. 15, 2021, 20 pages (with English translation).
(Continued)

*Primary Examiner* — Douglas M Wilson
(74) *Attorney, Agent, or Firm* — Fish & Richardson P.C.

(57) ABSTRACT

A display device for a vehicle includes a first frame, a second frame configured to be move along a first direction with respect to the first frame, a roller rotatably coupled to the second frame and configured to move along the first direction based on movement of the second frame, and a flexible display that is at least partially wound around the roller and that is configured to be bent around the roller. The flexible display has an end portion fixed to the first frame. A front surface of the flexible display defines an externally exposed area that is configured to increase based on an increase of a distance between the first frame and the roller.

13 Claims, 16 Drawing Sheets

(51) Int. Cl.
*G09F 9/30* (2006.01)
*G06F 1/16* (2006.01)
*G09F 11/02* (2006.01)
*B60K 37/04* (2006.01)
*F16H 7/06* (2006.01)
*B60R 11/00* (2006.01)
*G09F 11/08* (2006.01)
*B60R 11/02* (2006.01)
*B60R 16/02* (2006.01)
*G09F 21/04* (2006.01)

(52) U.S. Cl.
CPC .. *B60K 2370/1533* (2019.05); *B60K 2370/52* (2019.05); *B60K 2370/67* (2019.05); *B60K 2370/816* (2019.05); *B60R 11/0235* (2013.01); *B60R 16/02* (2013.01); *B60R 2011/0005* (2013.01); *B60R 2011/0057* (2013.01); *B60R 2011/0085* (2013.01); *B60Y 2400/3012* (2013.01); *B65H 2555/13* (2013.01); *F16H 7/06* (2013.01); *G06F 1/1652* (2013.01); *G09F 11/02* (2013.01); *G09F 11/08* (2013.01); *G09F 21/049* (2020.05)

(58) Field of Classification Search
CPC ..... B60R 16/02; B60R 11/0235; B60R 16/03; B60R 2011/0005; B60R 2011/0057; B60R 2011/0085; F16H 7/06; B60Y 2400/3012; B60L 2220/12; B65H 2555/13
See application file for complete search history.

(56) References Cited

U.S. PATENT DOCUMENTS

| | | | | |
|---|---|---|---|---|
| 10,201,103 | B2* | 2/2019 | Kim | H04N 5/655 |
| 2012/0268665 | A1* | 10/2012 | Yetukuri | B60N 2/879 |
| | | | | 348/837 |
| 2016/0037657 | A1* | 2/2016 | Yoshizumi | G09F 9/35 |
| | | | | 361/679.01 |
| 2016/0179141 | A1 | 6/2016 | Kim et al. | |
| 2016/0374228 | A1* | 12/2016 | Park | H05K 7/16 |
| 2017/0023177 | A1* | 1/2017 | Yomogita | F16H 25/20 |
| 2017/0349098 | A1* | 12/2017 | Uhm | G08G 1/0967 |
| 2018/0070466 | A1* | 3/2018 | Kim | H04N 5/655 |
| 2019/0384438 | A1* | 12/2019 | Park | G06F 3/0482 |
| 2021/0014982 | A1* | 1/2021 | Bok | H01L 27/322 |
| 2021/0103314 | A1* | 4/2021 | Ko | G06F 3/04817 |
| 2021/0191552 | A1* | 6/2021 | Bok | G06F 1/1658 |

FOREIGN PATENT DOCUMENTS

| | | |
|---|---|---|
| JP | H05027330 | 2/1993 |
| JP | H10264732 | 10/1998 |
| JP | 2001180390 | 7/2001 |
| JP | 2015152816 | 8/2015 |
| JP | 2019120893 | 7/2019 |

OTHER PUBLICATIONS

Extended European Search Report in European Application No. 20167738.2, dated Sep. 29, 2020, 8 pages.

* cited by examiner

DISPLAY DEVICE FOR VEHICLE

CROSS-REFERENCE TO RELATED APPLICATION

Pursuant to 35 U.S.C. § 119(a), this application claims the benefit of an earlier filing date of and the right of priority to Korean Application No. 10-2020-0003555, filed on Jan. 10, 2020, the contents of which are incorporated by reference herein in their entirety.

TECHNICAL FIELD

The present disclosure relates to a display device for a vehicle, and more particularly to a display device including a flexible display.

BACKGROUND

Flexible displays may be bendable while displaying image information and may be applied to foldable-type devices.

For example, the flexible display may include a folding structure in which a size of a screen may be changed to thereby reduce an installation space, enhance a portability, and provide a large-screen display.

In some cases, a flexible display may be a rollable-type or bending-type device including a rollable display. For instance, the flexible display can be wound to reduce a size or an area of the entire display, and the flexible display can be unwound to increase the size or the area of the entire display.

A dashboard of a vehicle may include a display device for displaying information related to driving of the vehicle and devices included in the vehicle, and the display device may provide convenience to a user (e.g., a driver) and aid the user for safe driving.

SUMMARY

The present disclosure describes a display device for a vehicle, which includes a flexible display.

The present disclosure also describes a display device for a vehicle that enables convenient adjustment of the size of a screen of a flexible display.

According to one aspect of the subject matter described in this application, a display device for a vehicle includes a first frame, a second frame configured to be move along a first direction with respect to the first frame, a roller rotatably coupled to the second frame and configured to move along the first direction based on movement of the second frame, and a flexible display that is at least partially wound around the roller and that is configured to be bent around the roller. The flexible display has an end portion fixed to the first frame. A front surface of the flexible display defines an externally exposed area that is configured to increase based on an increase of a distance between the first frame and the roller.

Implementations according to this aspect may include one or more of the following features. For example, the second frame may include a pair of bodies that are coupled to ends of the roller, respectively, and a connection bar that connects the pair of bodies to each other and that is configure to guide the flexible display in contact with the roller. In some implementations, the display device may further include a moving assembly configured to move the roller in the first direction, and an actuator configured to provide driving force to the moving assembly.

In some examples, the moving assembly may include a moving plate that is coupled to the second frame and that is configured to move along the first direction based on the roller moving in the first direction, and a chain that is coupled to the first frame, that is configured to be bent around the roller, and that is configured to support at least a portion of a rear surface of the flexible display. In some examples, the chain may include a first link that defines a first link hole, a second link that defines a second link hole, and a link pin that is inserted into the first link hole and the second link hole and that connects the first link and the second link to each other. The first link hole may have an elongated slot shape having a first diameter in a longitudinal direction of the chain and a second diameter in a thickness direction of the chain, the first diameter being greater than the second diameter.

In some implementations, the moving assembly may further include a backplate that faces the flexible display and that defines a through-hole at a position corresponding to the roller, where at least a portion of the backplate may include an elastic metal plate. In some examples, the display may further include a first magnet that is disposed at a portion of the flexible display and that couples the flexible display to the backplate.

In some examples, the chain has an end portion fixed to the first frame. In some examples, the actuator may include a linear motor.

In some implementations, the actuator may include a first bracket coupled to the first frame, a second bracket that is coupled to the first bracket and that extends in the first direction, and a third bracket coupled to the moving plate and configured to move along the first direction with respect to the second bracket.

In some examples, the second bracket may include a plurality of coils that are arranged along the first direction, that are spaced apart from one another by a predetermined interval in the first direction, and that are configured to receive power to move the third bracket. In some examples, the third bracket may include a plurality of magnets that are configured to face the plurality of coils and that are arranged along the first direction, and that are spaced apart from one another by a predetermined interval in the first direction.

In some implementations, the roller may be configured to move by a distance in the first direction based on the third bracket moving by the distance in the first direction.

In some implementations, the first frame is fixed to a dashboard of the vehicle, and the flexible display may be configured to protrude outward from the dashboard of the vehicle based on the second frame moving along the first direction with respect to the first frame. In some implementations, the display device may further include a guide bar that is coupled to the first frame and that extends in the first direction, where the guide bar may define a guide rail that receives a protruding portion of the second frame.

In some implementations, the display device may further include a magnet coupled to the second frame and a Hall sensor that is coupled to the first frame, that is configured to sense a spacing distance relative to the magnet, and that allows a controller of the vehicle to determine the externally exposed area based on the sensed spacing distance. In some implementations, the display device may be configured to be controlled by a controller of the vehicle to thereby change the externally exposed area according to a user or a device in the vehicle.

According to another aspect, a display device for a vehicle includes a first frame, a second frame configured to move along a first direction with respect to the first frame, a roller rotatably coupled to the second frame and configured to move along the first direction based on movement of the second frame, and a flexible display that is at least partially wound around the roller and that is configured to be bent around the roller. The flexible display has an end portion fixed to the first frame. The flexible display is configured to, based on the roller moving away from the first frame along the first direction, switch from a first state to a second state that is different from the first state, and based on the roller moving toward the first frame along the first direction, switch from the second state to the first state.

Implementations according to this aspect may include one or more of the following features or the features of the display device described above. For example, a front surface of the flexible display may define an externally exposed area, and the externally exposed area in the second state may be greater than the externally exposed area in the first state.

In some implementations, the display device may further include a moving plate attached to the flexible display and configured to move along the first direction based on the roller moving along the first direction, a chain that has a first end coupled to the first frame and a second end coupled to the moving plate and that is configured to be bent around the roller and to support at least a portion of a rear surface of the flexible display, a first bracket coupled to the first frame, a second bracket that is coupled to the first bracket and that extends in the first direction, and a third bracket coupled to the second frame and configured to move along the first direction with respect to the second bracket.

In some implementations, the externally exposed area of the flexible display may be automatically adjusted by an actuator, which may adjust the size of the screen on which image information is displayed according to the convenience of the user.

In some implementations, a backplate may be configured to closely contact the rear surface of the flexible display, and may support the flexible display so as to secure a planar surface of the flexible display. As a result, the flexible display may provide a high-quality image to the driver or the like.

In some implementations, movement of the second frame and the roller in the first direction is stably supported by a guide bar, which may prevent or reduce wrinkling of the flexible display or damage thereto and may prevent or reduce damage to the vehicle display device or malfunction thereof.

In some implementations, the flexible display and the backplate are securely coupled to each other by a first magnet, which may help to prevent the backplate from being pushed against the flexible display due to repeated movement of the flexible display.

In some implementations, the display device including a flexible display may help to save a space in a dashboard, which may be a relatively small space, and to implement a large-screen display, thereby improving user convenience.

Aspects and effects of the present disclosure are not limited to the aspects and effects described above, and other aspects and effects that are not stated herein will be clearly understood by those skilled in the art from the following description.

BRIEF DESCRIPTION OF THE DRAWINGS

The above and other aspects, features, and advantages of the present disclosure will become apparent from the detailed description of the following aspects in conjunction with the accompanying drawings.

DETAILED DESCRIPTION

Figure 1:
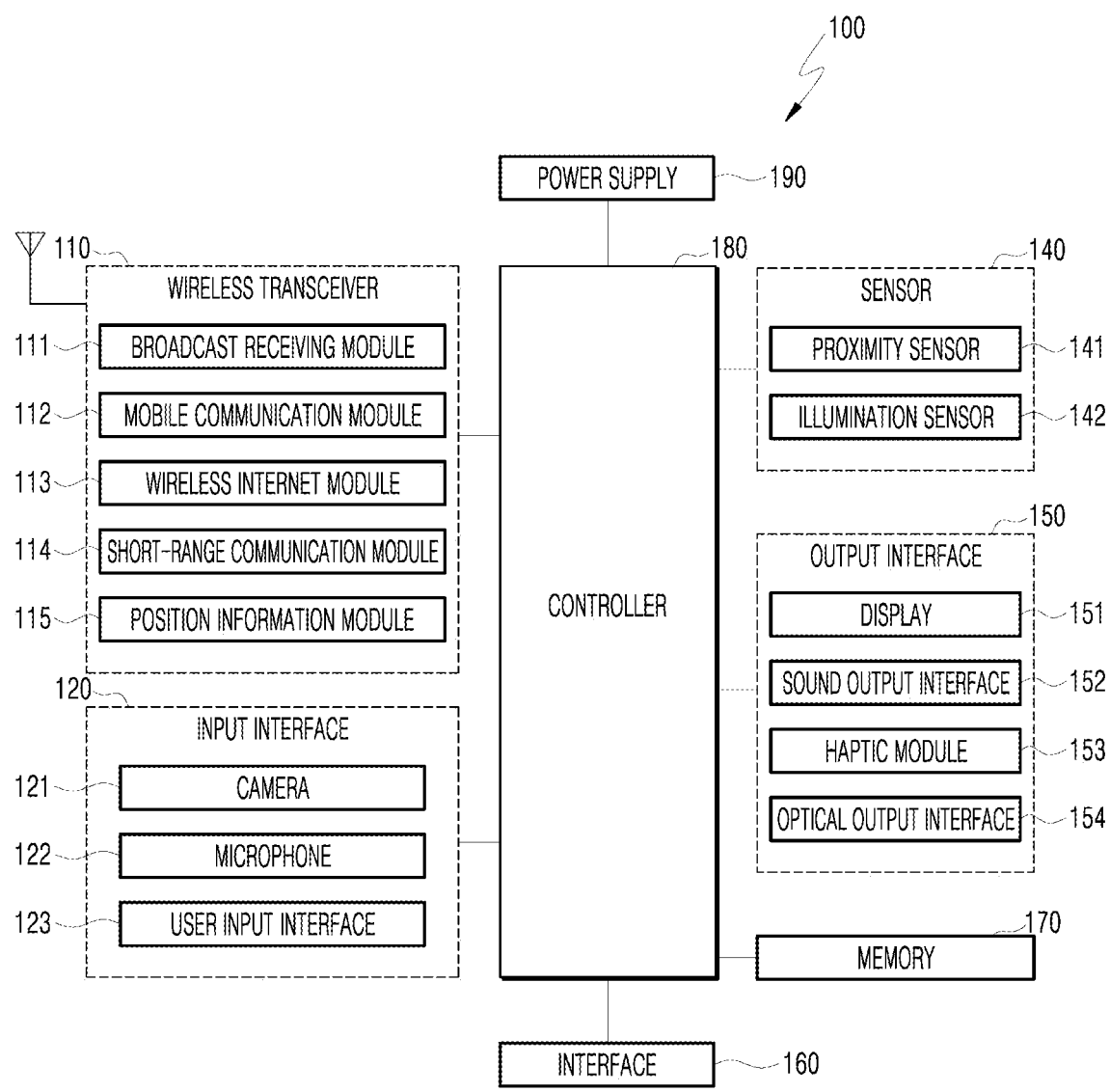
FIG. 1 is a block diagram illustrating an example of a vehicle display device.

Hereinbelow, one or more implementations will be described in greater detail with reference to the accompanying drawings. The implementations may be modified in various ways and may have various forms, and specific implementations will be illustrated in the drawings and will be described in detail herein. However, this is not intended to limit the implementations to the specific implementations, and the implementations should be understood as including all modifications, equivalents, and replacements that fall within the spirit and technical scope of the implementations.

In the drawings, a rectangular coordinate system (x, y, z) may be used. For example, the x-axis direction may refer to a first direction, the y-axis direction may refer to a second direction, and the z-axis direction may refer to a third direction.

FIG. 1 is a block diagram illustrating an example of a vehicle display device 100.

The vehicle display device 100 may be mounted to, for example, a dashboard 10 of the vehicle, and may be configured to display information related to control of various devices used to operate the vehicle, information related to operation of the vehicle, and information related to convenience to an occupant of the vehicle.

In some implementations, the vehicle display device 100 may include a wireless transceiver 110, an input interface 120, a sensor 140, an output interface 150, an interface 160, a memory 170, a controller 180, and a power supply 190. Components shown in FIG. 1 are not essential to implement the vehicle display device, and the vehicle display device described in this specification may include a greater or smaller number of components than those described above.

In some examples, the wireless transceiver 110 may include one or more modules that enable wireless communication between the vehicle display device 100 and a wireless communication system, between the vehicle display device 100 and another vehicle display device 100, or between the vehicle display device 100 and an external server. Further, the wireless transceiver 110 may include one or more modules which connect the vehicle display device 100 to one or more networks.

For instance, the wireless transceiver 110 may include at least one of a broadcast receiving module 111, a mobile communication module 112, a wireless Internet module 113, a short-range communication module 114, or a position information module 115.

In some implementations, the input interface 120 may include a camera 121 or an image input interface which receives input of an image signal, a microphone 122 or an audio input interface which receives input of an audio signal, and a user input interface 123 (for example, a touch key or a mechanical key) which receives information from a user. Voice data or image data collected by the input interface 120 is analyzed and processed as a control command of the user.

The sensor 140 may include one or more sensors that sense at least one of information in the vehicle display device, surrounding environment information around the vehicle display device, or user information. For example, the sensor 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, a camera 121 or a microphone 122), a battery gauge, an environment sensor (for example, a barometer, a hygrometer, a thermometer, a radiation sensor, a thermal sensor, and a gas sensor), or a chemical sensor (for example, an electronic nose, a healthcare sensor, and a biometric sensor). Further, the vehicle display device disclosed in the present specification may combine and utilize information sensed by at least two sensors from the above-mentioned sensors.

The output interface 150 is intended to generate an output related to a visual, aural, or tactile stimulus, and may include at least one among a display 151, sound output interface 152, haptic module 153, and optical output interface 154. The display 151 may be configured as a touch screen by forming a mutual layered structure with a touch sensor or being formed integrally therewith. The touch screen may serve as a user input interface 123 that provides an input interface between the vehicle display device 100 and the user, and at the same time, may provide an output interface between the vehicle display device 100 and the user.

The interface 160 may provide a communication passage between the vehicle display device 100 and various types of external devices connected to the vehicle display device 100. For example, the interface 160 may include at least one of a wired/wireless headset port, an external charger port, a wired/wireless data port, a memory card port, a port which connects a device equipped with an identification module, an audio input/output (I/O) port, a video input/output (I/O) port, or an earphone port. The vehicle display device 100 may perform appropriate control related to the connected external device in accordance with the connection of the external device to the I/O ports of the interface 160.

The memory 170 (e.g., non-transitory memory device) may store data for supporting various functions of the vehicle display device 100. The memory 170 may store a plurality of application programs or applications that are driven by the vehicle display device 100, data for operating the vehicle display device 100, and instructions. At least some of the application programs may be downloaded via an external server through wireless communication. Further, at least some of the application programs may be present in the vehicle display device 100 from the time of release in order to perform the basic functions of the vehicle display device 100 (for example, functions for receiving and making calls, and sending and receiving messages). The application programs may be stored in the memory 170, and may be installed in the vehicle display device 100 so as to be driven by the controller 180 to perform operations (or functions) of the vehicle display device.

In addition to the operation related to the application programs, the controller 180 may control overall operation of the vehicle display device 100. The controller 180 may process signals, data, or information which is inputted or outputted through the above-described components, or drive the application programs stored in the memory 170 to provide or process appropriate information or functions to the user.

Further, in order to drive the application program stored in the memory 170, the controller 180 may control at least some of components described with reference to FIG. 1. Moreover, the controller 180 may combine and operate at least two of the components included in the vehicle display device 100 to drive the application program. For example, the controller 180 may include one or more processors, a computer, an electric circuit, a microprocessor, or the like.

The power supply 190 may receive external power and supply the power to the respective components included in the vehicle display device 100 under the control of the controller 180. At least some of the above-described components may operate in cooperation with each other to implement the operation, the control, or the control method of the vehicle display device according to various implementations, which will be described below. Further, the operation, the control, or the control method of the vehicle display device may be implemented in the vehicle display device by driving at least one application program stored in the memory 170.

Hereinafter, the above-mentioned components will be described in more detail with reference to FIG. 1.

The wireless transceiver 110 will be described. The broadcast receiving module 111 of the wireless transceiver 110 may receive a broadcast signal and/or broadcast-related information from an external broadcast management server through a broadcast channel. The broadcast channel may include a satellite channel and a ground wave channel. Two or more broadcast receiving modules for simultaneous broadcast reception or broadcast channel switching for at least two broadcast channels may be provided in the vehicle display device 100.

The broadcast management server may refer to a server which generates and transmits a broadcast signal and/or broadcast-related information, or a server which is supplied with a previously generated broadcast signal and/or broadcast-related information and transmits the broadcast signal and/or the broadcast-related information to the vehicle display device. The broadcast signal includes not only a TV broadcast signal, a radio broadcast signal, and a data broadcast signal, but also a broadcast signal obtained by combining a TV broadcast signal or a radio broadcast signal with a data broadcast signal.

The broadcast signal may be encoded according to at least one technical standard for transmitting and receiving a digital broadcast signal (or broadcast schemes, for example, ISO, IEC, DVB, or ATSC), and the broadcast receiving module 111 may receive the digital broadcast signal using an appropriate method for the technical specification determined by the technical standard.

The broadcast-related information may refer to information related to a broadcast channel, a broadcast program, or a broadcast service provider. The broadcast-related information may also be provided through the mobile communication network. In this case, the broadcast-related information may be received by the mobile communication module 112.

The broadcast-related information may exist in various types such as an electronic program guide of digital multimedia broadcast (DMB) or an electronic service guide of a digital video broadcast-handheld (DVB-H). The broadcast signal and/or the broadcast-related information received by the broadcast receiving module 111 may be stored in the memory 170.

The mobile communication module 112 may include a modem that may transmit/receive a wireless signal to/from at least one among a base station, an external terminal, or a server on a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless signal may include a voice call signal, a video call signal, or various types of data in accordance with transmission or reception of a text/multimedia message.

The wireless Internet module 113 refers to a module for wireless Internet access and may be built in or external to the vehicle display device 100. The wireless Internet module 113 may be configured to transmit/receive a wireless signal in a communication network according to wireless Internet technologies.

Wireless Internet technologies may include wireless LAN (WLAN), wireless fidelity (Wi-Fi), Wi-Fi direct, Digital Living Network Alliance (DLNA), wireless broadband (WiBro), Worldwide Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A). The wireless Internet module 113 may transmit or receive data in accordance with at least one wireless Internet technology, including Internet technologies which have not been described above.

From the viewpoint that the wireless Internet connection by WiBro, HSDPA, HSUPA, GSM, CDMA, WCDMA, LTE, LTE-A, etc. is performed through a mobile communication network, the wireless Internet module 113 which performs the wireless Internet connection through the mobile communication network may be understood as a type of the mobile communication module 112.

The short-range communication module 114 may support short-range communication using at least one of Bluetooth™, infrared data association (IrDA), ultra-wideband (UWB), ZigBee, Short-range Communication (NFC), wireless fidelity (Wi-Fi), Wi-Fi Direct, or Wireless Universal Serial Bus (Wireless USB). The short-range communication module 114 may support wireless communication between the vehicle display device 100 and the wireless communication system, between the vehicle display device 100 and another vehicle display device 100, or between the vehicle display device 100 and a network in which another vehicle display device 100 (or an external server) is located through the short-range wireless communication network. The short-range wireless communication network may be a short-range wireless personal communication network.

In some implementations, the position information module 115 may include a global navigation satellite system (GNSS). The GNSS may include a sensor for obtaining the location (or the current location) of the vehicle display device, and its representative examples include a global positioning system (GPS) module or a Wi-Fi module. For example, when the GPS module is utilized, the vehicle display device may obtain the position of the vehicle display device using a signal transmitted from a GPS satellite. As another example, when the Wi-Fi module is utilized, the vehicle display device may obtain the position of the vehicle display device based on information of a wireless access point (AP) that transmits and receives wireless signals to and from the Wi-Fi module. In some cases, the position information module 115 may perform a function of another module of the wireless transceiver 110 to alternatively or additionally obtain data on the position of the vehicle display device. The position information module 115 is a module used to obtain the position (or the current position) of the vehicle display device, and is not limited to a module that directly calculates or obtains the position of the vehicle display device.

In some implementations, the input interface 120 may be provided to input video information (or signals), audio information (or signals), data, or information inputted from the user. For example, in order to receive input of video information, the vehicle display device 100 may include one or more cameras 121. The camera 121 may process an image frame such as a still image or a moving image obtained by an image sensor in a video call mode or a photographing mode. The processed image frames may be displayed on the display 151 or stored in the memory 170. Further, the plurality of cameras 121 equipped in the vehicle display device 100 may be disposed to form a matrix structure, and a plurality of pieces of image information having various angles or focal points may be inputted to the vehicle display device 100 through the cameras 121 that form the matrix structure. Further, the cameras 121 may be disposed to have a stereo structure to obtain a left image and a right image to implement a stereoscopic image.

The microphone 122 may process an external sound signal as electronic voice data. The processed voice data may be utilized in various forms in accordance with a function being performed by the vehicle display device 100 (or an application program which is being executed). In the microphone 122, various noise removal algorithms which remove noise generated during the process of receiving the external sound signal may be implemented.

The user input interface 123 may receive information from the user, and when the information is inputted through the user input interface 123, the controller 180 may control the operation of the vehicle display device 100 so as to correspond to the inputted information. The user input interface 123 may include a mechanical input interface (or a mechanical key, for example, a button located on a front, rear, or side surface of the vehicle display device 100, a dome switch, a jog wheel, a jog switch, or the like) and a touch type input interface. As one example, the touch type input interface may include a virtual key, a soft key, or a visual key displayed on the touch screen via a software process, or may include a touch key disposed on a portion other than the touch screen. The virtual key or the visual key may be displayed on the touch screen in various shapes, and for example, may be formed by graphics, text, icons, video, or a combination thereof.

The sensor 140 may sense at least one of information in the vehicle display device, surrounding environment information around the vehicle display device, or user information, and generates a sensing signal corresponding to the sensed information. The controller 180 may control the driving or the operation of the vehicle display device 100, or may perform data processing, functions, or operations related to the application program installed in the vehicle display device 100, based on the sensing signal. Representative sensors among the various sensors which may be included in the sensor 140 will be described in more detail below.

For example, the sensor may include a proximity sensor 141 that is configured to sense the presence of an object approaching a predetermined sensing surface or nearby objects, using an electromagnetic field force or infrared ray without any mechanical contact. The proximity sensor 141 may be disposed in an internal area of the vehicle display device, which is enclosed by the above-described touch screen, or in the vicinity of the touch screen.

Examples of the proximity sensor 141 may include a transmission type photoelectric sensor, a direct reflection type photoelectric sensor, a mirror reflection type photoelectric sensor, a high frequency oscillation type proximity sensor, a capacitive proximity sensor, a magnetic proximity sensor, and an infrared proximity sensor. When the touch screen is a capacitive type, the proximity sensor 141 may be configured to detect the proximity of the object with a change in the electric field in accordance with the proximity of the object having conductivity. In this case, the touch screen (or the touch sensor) itself may be classified as a proximity sensor.

For convenience of description, when an object approaches the touch screen without contacting the touch screen, and it is recognized that the object is located above the touch screen, it is referred to as a "proximity touch." When the object actually touches the touch screen, it is referred to as a "contact touch." A position at which the object proximately touches the touch screen refers to a position at which the object vertically corresponds to the touch screen when the object proximately touches the touch screen. The proximity sensor 141 may sense a proximate touch and a proximate touch pattern (for example, a proximate touch distance, a proximate touch direction, a proximate touch speed, a proximate touch time, a proximate touch position, a proximate touch movement state, etc.).

As described above, the controller 180 may process data (or information) corresponding to the proximate touch operation and the proximate touch pattern sensed by the proximity sensor 141, and may further output visual information corresponding to the processed data on the touch screen. Furthermore, the controller 180 may control the vehicle display device 100 to process different operations or data (or information) depending on whether the touch on the same point on the touch screen is a proximity touch or a contact touch.

The touch sensor senses a touch (or a touch input) applied to the touch screen (or the display 151) using at least one of various touch types such as a resistive film type, a capacitive type, an infrared type, an ultrasonic type, or a magnetic field type.

For example, the touch sensor may be configured to convert a change of a pressure which is applied to a specific portion of the touch screen, or a capacitance which is generated in a specific portion, into an electrical input signal. The touch sensor may be configured to detect a position and an area where a touch subject which applies a touch onto the touch screen is touched on the touch sensor, and a capacitance at the time of the touch. Here, the touch subject is an object which applies a touch to the touch sensor, and may include, for example, a finger, a touch pen, a stylus pen, and a pointer.

As described above, when there is a touch input to the touch sensor, corresponding signals are transmitted to a touch controller. The touch controller processes the signal(s) and then transmits corresponding data to the controller 180. By doing this, the controller 180 may confirm which area of the display 151 is touched. Here, the touch controller may be a separate component from the controller 180, or may be the controller 180 itself.

The controller 180 may perform different control or the same control depending on a type of a touch subject which touches the touch screen (or a touch key equipped other than the touch screen). Whether to perform the different control or the same control depending on the type of touch subject may be determined in accordance with an operating state of the current vehicle display device 100 or an application program which is being executed.

The touch sensor and proximity sensor described above may, independently or in combination, sense various types of touches on the touch screen, such as a short (or tap) touch, a long touch, a multi touch, a drag touch, a flick touch, a pinch-in touch, a pinch-out touch, a swipe touch, or a hovering touch.

The ultrasonic sensor may recognize position information of a sensing object using an ultrasonic wave. The controller 180 may calculate a position of a wave generating source by information sensed by the optical sensor and the plurality of ultrasonic sensors. A position of the wave generating source may be calculated using the property that light is much faster than an ultrasonic wave, that is, the time in which light reaches the optical sensor is much faster than the time in which the ultrasonic wave reaches the ultrasonic sensor. More specifically, the position of the wave generating source may be calculated using a time difference of the time of arrival of the ultrasonic wave with respect to light which serves as a reference signal.

As seen from the configuration of the input interface 120, the camera 121 includes at least one of a camera sensor (for example, a CCD or a CMOS), a photo sensor (or an image sensor), or a laser sensor.

The camera 121 and the laser sensor may be combined to sense a touch of a sensing object for a three-dimensional stereoscopic image. The photo sensor, which is laminated on a display element, is configured to scan a motion of a sensing object proximate to the touch screen. More specifically, the photo sensor is formed by mounting photo diodes and transistors (TR) in rows/columns to scan contents which are disposed on the photo sensor using an electrical signal that changes in accordance with an amount of light applied to the photo diode. That is, the photo sensor calculates coordinates of a sensing object in accordance with a changed amount of light, and position information of the sensing object may be obtained through the coordinates.

The display 151 displays (outputs) information processed in the vehicle display device 100. For example, the display 151 may display execution screen information of an application program executed in the vehicle display device 100, or user interface (UI) or graphic user interface (GUI) information according to the execution screen information.

Further, the display 151 may be configured as a stereoscopic display which displays a stereoscopic image.

A three-dimensional display type such as a stereoscopic type (a glass type), an autostereoscopic type (a glass-free type), a projection type (a holographic type) may be applied to the stereoscopic display.

The speaker 152 may output audio data received from the wireless transceiver 110 or stored in the memory 170 in a call signal reception mode, a phone-call mode, a recording mode, a speech recognition mode, or a broadcast reception mode. The sound output interface 152 may also output a sound signal related to a function (for example, a call signal reception sound or a message reception sound) performed in the vehicle display device 100. Such a sound output interface 152 may include, for example, a receiver, a speaker, and a buzzer.

The haptic module 153 may generate various tactile effects that can be felt by the user. A representative example of the tactile effect generated by the haptic module 153 may be vibration. An intensity and a pattern of the vibration generated in the haptic module 153 may be controlled by the selection of the user or a setting of the controller 180. For example, the haptic module 153 may compose different vibrations to output the composed vibrations, or sequentially output the different vibrations.

In addition to vibration, the haptic module 153 generates various tactile effects such as effects by a pin arrangement which vertically moves to a contact skin surface, an injection force or a suction force of air through an injection port or a suction port, grazing on a skin surface, electrode contact, or stimulation of an electrostatic force or effects of reproducing a cold or hot sensation using a heat absorbing or heat emitting element.

The haptic module 153 may not only transmit a tactile effect by means of direct contact, but may also be implemented to allow the user to feel a tactile effect by muscular sensation of a finger or an arm. Two or more haptic modules 153 may be provided in accordance with the configuration of the vehicle display device 100.

The optical output interface 154 outputs a signal for indicating the occurrence of an event using light from a light source of the vehicle display device 100. Examples of events generated in the vehicle display device 100 may be message reception, call signal reception, missed call, alarm, schedule notification, email reception, and information reception through an application.

The signal outputted from the optical output interface 154 is implemented in a form in which the vehicle display device emits single-colored or multi-colored light toward the front surface or the rear surface thereof. When the vehicle display device senses event confirmation by the user, the signal output may be terminated.

The interface 160 serves as a passage between the vehicle display device 100 and all external devices connected to the vehicle display device 100. The interface 160 receives data from the external devices, or receives power to transmit same to the respective components in the vehicle display device 100, or transmits data in the vehicle display device 100 to the external devices. For example, the interface 160 may include a wired/wireless headset port, an external charger port, a wired/wireless data port, a memory card port, a port which connects a device equipped with an identification module, an audio input/output (I/O) port, a video input/output (I/O) port, an earphone port, etc.

In the meantime, the identification module is a chip in which various information for authenticating a usage right of the vehicle display device 100 is stored and includes a user identification module (UIM), a subscriber identification module (SIM), and a universal subscriber identity module (USIM). A device with an identification module (hereinafter, "identification device") may be manufactured as a smart card. Therefore, the identification device may be connected to the vehicle display device 100 through the I/O connector 160.

The memory 170 may store a program for an operation of the controller 180, or temporarily store input/output data (for example, a phone book, a message, a still image, a moving image, etc.). The memory 170 may store data on a vibration or a sound of various patterns output when the touch is inputted onto the touch screen.

The memory 170 may include at least one type of storage medium of a flash memory type, a hard disk type, a solid state disk (SSD) type, a silicon disk drive (SDD) type, a multimedia card micro type, and card type memories (for example, SD or XD memory and the like), a random access memory (RAM), a static random access memory (SRAM), a read only memory (ROM), an electrically erasable programmable read only memory (EEPROM), a programmable read only memory (PROM), a magnetic memory, a magnetic disk, and an optical disk. The vehicle display device 100 may operate in association with a web storage which performs a storage function of the memory 170 on the Internet.

As described above, the controller 180 may control an operation related to the application program and an overall operation of the vehicle display device 100. For example, when the state of the vehicle display device satisfies a predetermined condition, the controller 180 may execute or release a locking state which restricts an input of a control command of a user for the applications.

Further, the controller 180 may perform control and processing related to voice call, data communication, and video call, or perform a pattern recognition process which recognizes a handwriting input or a picture drawing input performed on the touch screen as a text or an image, respectively. Moreover, the controller 180 may control any one or a combination of a plurality of components described above to implement various implementations which will be described below on the vehicle display device 100 according to the present disclosure.

The display 151 displays (outputs) information processed in the vehicle display device 100. For example, the display 151 may display execution screen information of an application program executed in the vehicle display device 100, or user interface (UI) or graphic user interface (GUI) information according to the execution screen information.

The display 151 may include at least one of a liquid crystal display (LCD), a thin film transistor liquid crystal display (TFT LCD), an organic light emitting diode (OLED), a three-dimensional display (3D display), or an electronic ink display (e-ink display), or other types of flexible displays.

In some implementations, two or more displays 151 may be provided in accordance with the configuration of the vehicle display device 100. For example, a plurality of displays may be spaced apart from each other or integrally disposed on one surface of the vehicle display device 100 or may be disposed on different surfaces.

The display 151 may include a touch sensor which senses a touch on the display 151 so as to receive the control command by the touch method. Therefore, when the touch is made on the display 151, the touch sensor senses the touch, and based on the touch the controller 180 generates a control command corresponding to the touch. Contents inputted by the touch method may be letters or numbers, instructions in various modes, menu items which may be designated, or the like.

The microphone 122 is configured to receive a voice of the user, or other sounds. The microphone 122 is equipped in a plurality of locations to receive stereo sounds.

The interface 160 serves as a passage through which the vehicle display device 100 is connected to external devices. For example, the interface 160 may be at least one of a connection terminal for connection with other devices (for example, an earphone or an external speaker), a port for short-range communication (for example, an infrared port (IrDA port), a Bluetooth port, a wireless LAN port, etc.), or a power supply terminal for supplying a power to the vehicle display device 100. The interface 160 may be implemented as a socket type which accommodates an external card such as a subscriber identification module (SIM), a user identity module (UIM), and a memory card for information storage.

At least one antenna for wireless communication may be provided in the vehicle display device. The antenna may be embedded in the vehicle display device, or may be formed in a case of the vehicle display device. For example, the antenna which forms a part of the broadcast receiving module 111 (see FIG. 1) may be configured to be drawn from the vehicle display device. Alternatively, the antenna may be formed as a film type to be attached onto an inner surface of a housing, or a case including a conductive material may serve as an antenna.

Figure 2:
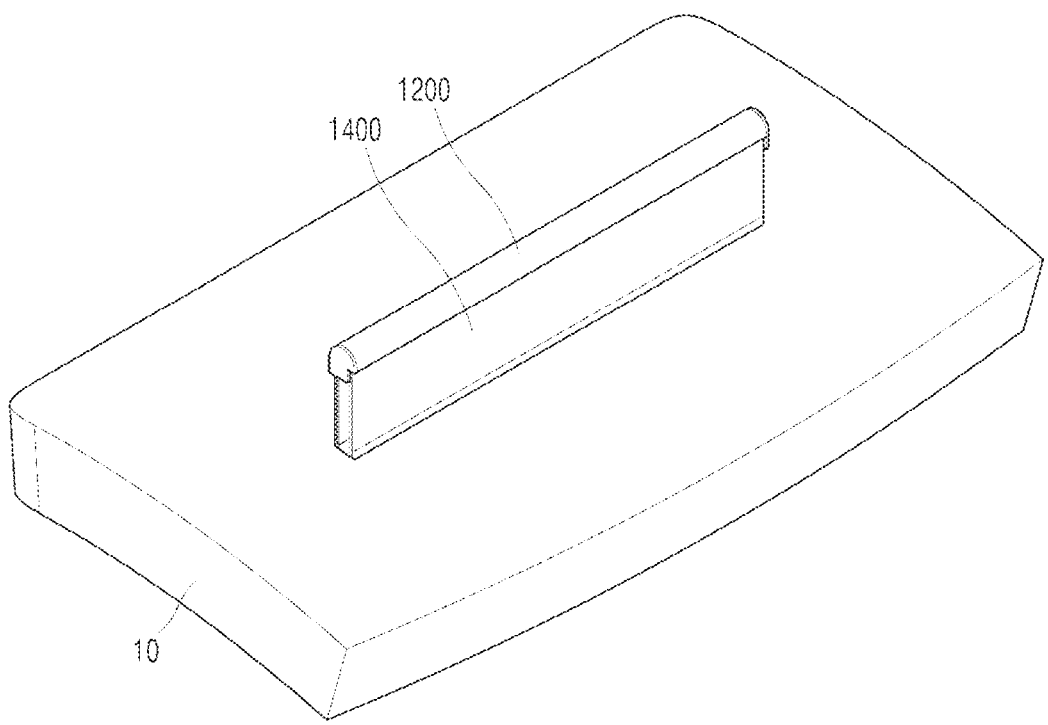
FIG. 2 is a perspective view showing the vehicle display device in an example state.
Figure 3:
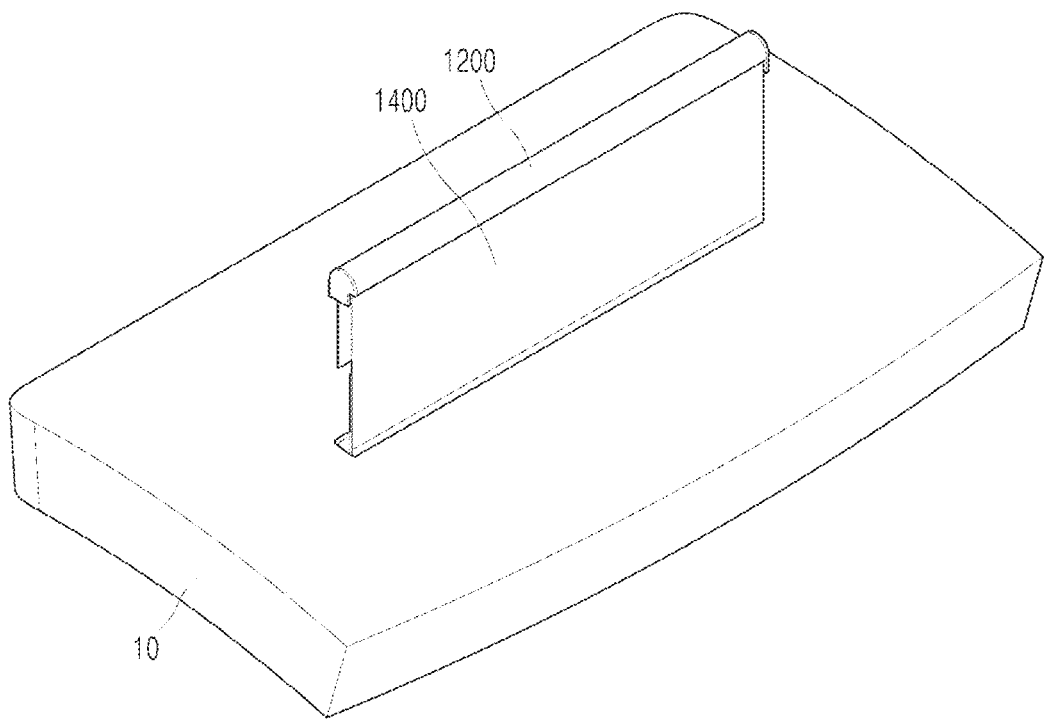
FIG. 3 is a perspective view showing the vehicle display device in another example state changed from the state in FIG. 2.

FIG. 2 is a perspective view showing an example of a vehicle display device in an example state. FIG. 3 is a perspective view showing the vehicle display device in another example state that is different from the state in FIG. 2.

Figure 4:
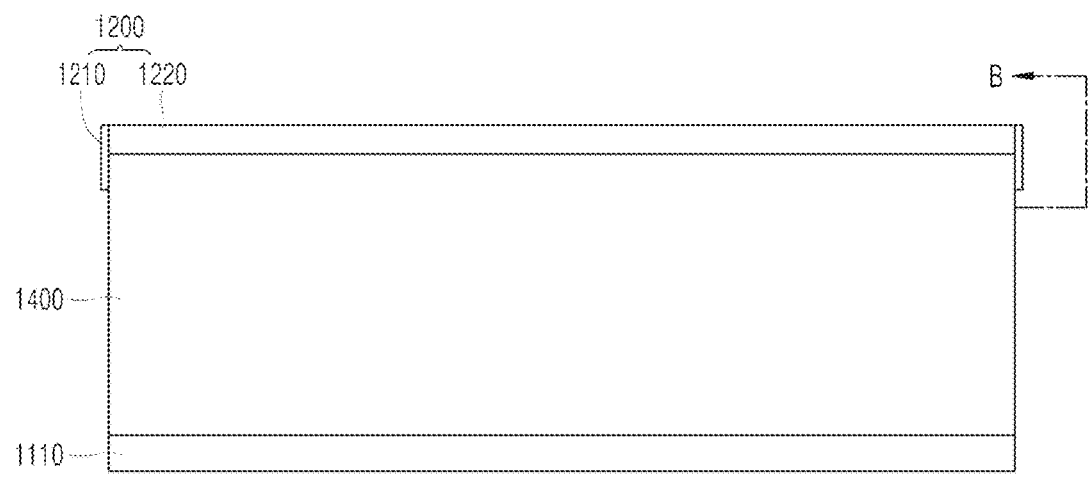
FIG. 4 is a front view showing the vehicle display device in an example state.
Figure 5:
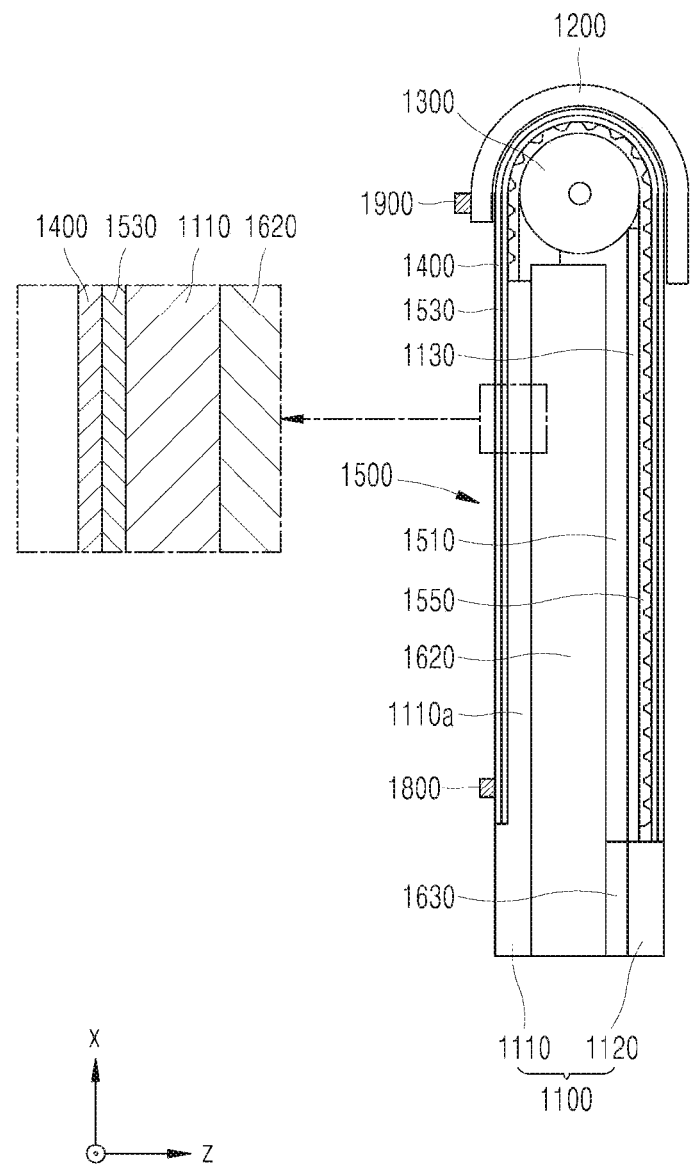
FIG. 5 is a side view of FIG. 4.
Figure 6:
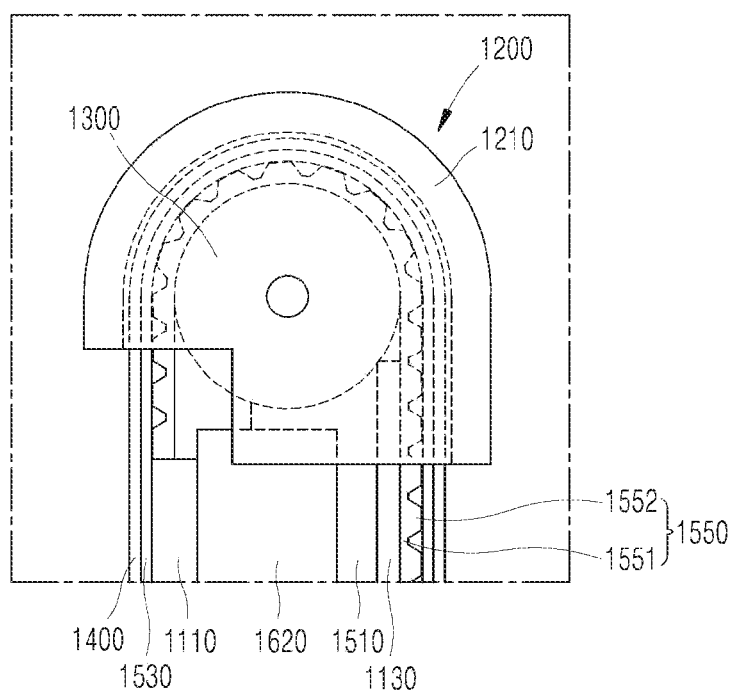
FIG. 6 is a side view of a portion B in FIG. 4.

FIG. 4 is a front view showing the vehicle display device. FIG. 5 is a side view of FIG. 4. FIG. 6 is a view of a portion B in FIG. 4 when viewed from the direction indicated in FIG. 4.

The vehicle display device 100 may include a first frame 1100, a roller 1300, and a flexible display 1400.

The first frame 1100 may be configured to be secured to the dashboard 10 of the vehicle. The dashboard 10 of the vehicle may have a groove formed therein to accommodate the vehicle display device therein, and the first frame 1100 may be disposed at an appropriate position in the groove.

In some implementations, the first frame 1100 may be fixedly coupled to the dashboard 10 in a screw-engagement manner, an interference-fit manner, or in any other appropriate coupling manners.

The first frame 1100 may include a front frame 1110 and a rear frame 1120. The front frame 1110 and the rear frame 1120 may be disposed so as to be spaced apart from each other in a direction perpendicular to the first direction, that is, in the z-axis direction, as shown in FIG. 5.

The front frame 1110 may be disposed at the front portion of the vehicle display device. The flexible display 1400 may be coupled to the front frame 1110.

Referring to FIG. 5, the front frame 1110 may include an extension frame 1110a, which has a relatively small thickness, and the flexible display 1400 may be coupled to the front surface of the extension frame 1110a using, for example, an adhesive.

In the case in which a backplate 1530 is disposed between the flexible display 1400 and the front frame 1110, the flexible display 1400 and the front frame 1110 may not be in direct contact with each other, or may not be directly coupled to each other.

The rear frame 1120 may be disposed at the rear portion of the vehicle display device, and may be coupled to a second bracket 1620 so as to securely support the second bracket 1620, thereby preventing undesirable movement of the second bracket 1620. For example, the rear frame 1120 may be fixedly coupled to the side surface of the second bracket 1620 so as to support the second bracket 1620.

In some implementations, the rear frame 1120 may be omitted from the vehicle display device. For example, the rear frame 1120 may be eliminated, so long as the front frame 1110 is capable of being coupled to the second bracket 1620 and securely supporting the second bracket 1620 so as to restrict movement of the second bracket 1620.

A second frame 1200 may be provided to be movable in the first direction with respect to the first frame 1100. The roller 1300 may be coupled to the second frame 1200 via a pin so as to be rotatable. When the second frame 1200 moves in the first direction, the roller 1300 may also move in the first direction together therewith.

For example, the first direction may be the upward-downward direction of the vehicle or a direction that is inclined at a predetermined angle with respect to the upward-downward direction. The first direction may be a direction substantially parallel to the front surface of the flexible display 1400. The first direction may be appropriately adjusted for the convenience of the driver who views the flexible display 1400.

The roller 1300 may be rotatably coupled to the second frame 1200, and may move in the first direction according to the movement of the second frame 1200.

Further, the roller 1300 may be formed in the shape of a bar that is disposed such that the longitudinal direction thereof is oriented in a direction perpendicular to the first direction, and may thus support the flexible display 1400 in the width direction of the flexible display 1400, that is, in the direction perpendicular to the first direction.

As shown in FIGS. 4, 5 and 6, the second frame 1200 may include a pair of bodies 1210 and a connection bar 1220.

The bodies 1210 may be provided as a pair, and may be coupled to the roller 1300 via a pin such that two opposite end portions of the roller 1300 are supported by the bodies 1210. Accordingly, the roller 1300 may be rotatably coupled to the bodies 1210, and may move together in the first direction according to the movement of the second frame 1200 in the first direction.

The connection bar 1220 may connect the pair of bodies 1210 to each other. In this case, for example, the pair of bodies 1210 and the connection bar 1220 may be integrally formed to each other. In addition, the connection bar 1220 may serve to bring the flexible display 1400 into close contact with the roller 1300.

Referring to FIG. 6, the flexible display 1400 may be disposed in a space formed between the inner surface of the connection bar 1220 and the surface of the roller 1300. The flexible display 1400 may be guided by the inner surface of the connection bar 1220 so as to be in close contact with the surface of the roller 1300.

The extent to which the flexible display 1400 is in close contact with the surface of the roller 1300 may be adjusted by appropriately adjusting the size of the space. The vehicle display device may be designed such that one surface of the flexible display 1400 is in direct contact with the surface of the roller 1300. However, in the case in which the backplate 1530 is provided between the flexible display 1400 and the roller 1300, the flexible display 1400 and the roller 1300 may not be in direct contact with each other.

In the case in which the backplate 1530 is provided, the size of the space between the inner surface of the connection bar 1220 and the surface of the roller 1300 may be appropriately set in consideration of the thickness of the backplate 1530. The backplate 1530 will be described in detail later.

Referring to FIG. 6, the bodies 1210 may be fixedly coupled to a moving plate 1510. The moving plate 1510 may be configured to be movable in the first direction. When the moving plate 1510 moves, the second frame 1200 and the roller 1300 coupled to the second frame 1200 may also move in the first direction together therewith.

The flexible display 1400 may be partially wound around the roller 1300 and bent thereby. One end portion of the flexible display 1400 may be secured to the first frame 1100. As described above, a portion of the flexible display 1400 may be coupled to the extension frame 1110a of the first frame 1100.

The flexible display 1400 may be formed of a flexible material, and thus may be wound around the roller 1300. When wound around the roller 1300, the flexible display 1400 may be bent by the roller 1300.

In this case, the portion of the flexible display 1400 that is in close contact with the roller 1300 may be bent, and the remaining portion of the flexible display 1400 may maintained a flat planar shape without being bent.

The flexible display 1400 refers to a durable display that is lightweight and non-fragile while still exhibiting the characteristics of a flat panel display, and is fabricated on a thin and flexible substrate that is capable of being warped, bent, folded, twisted, or rolled, like a sheet of paper.

Figure 7:
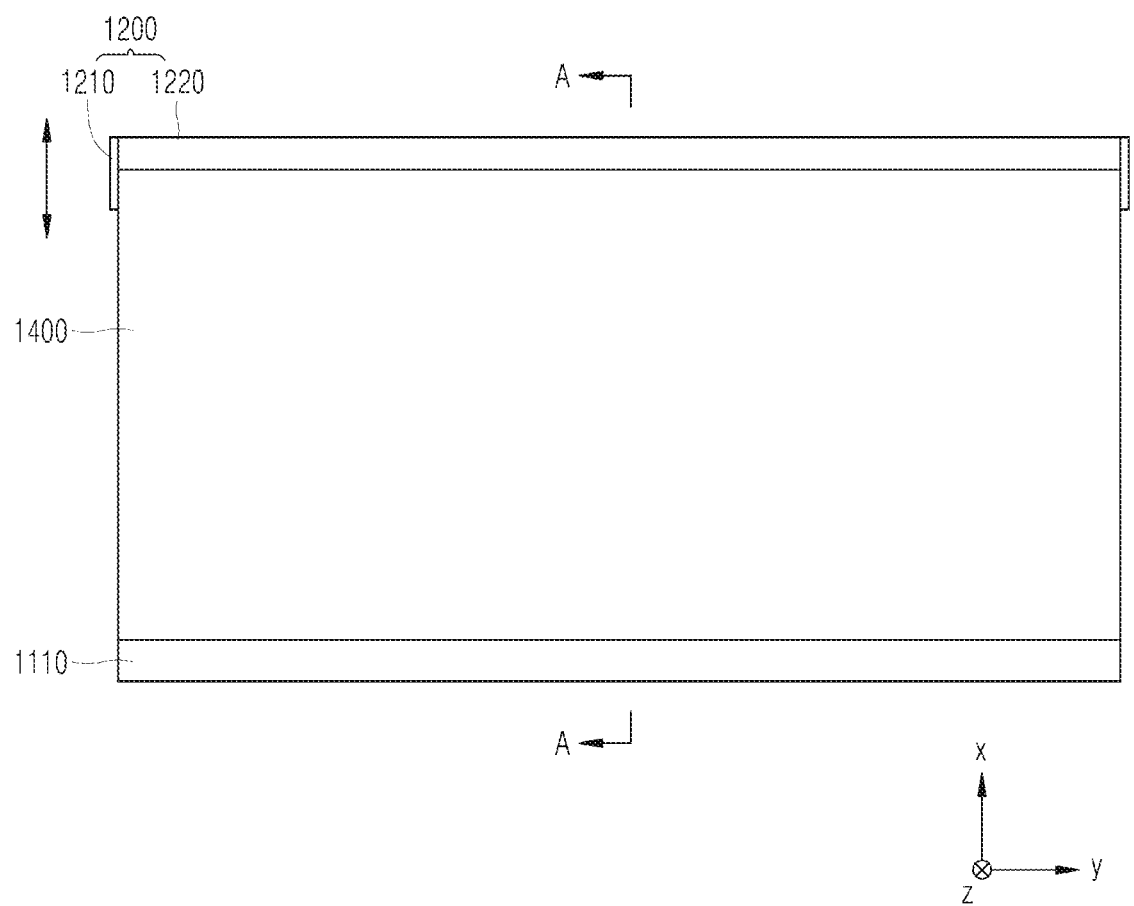
FIG. 7 is a front view showing the vehicle display device in another example state changed from the state in FIG. 4.
Figure 8:
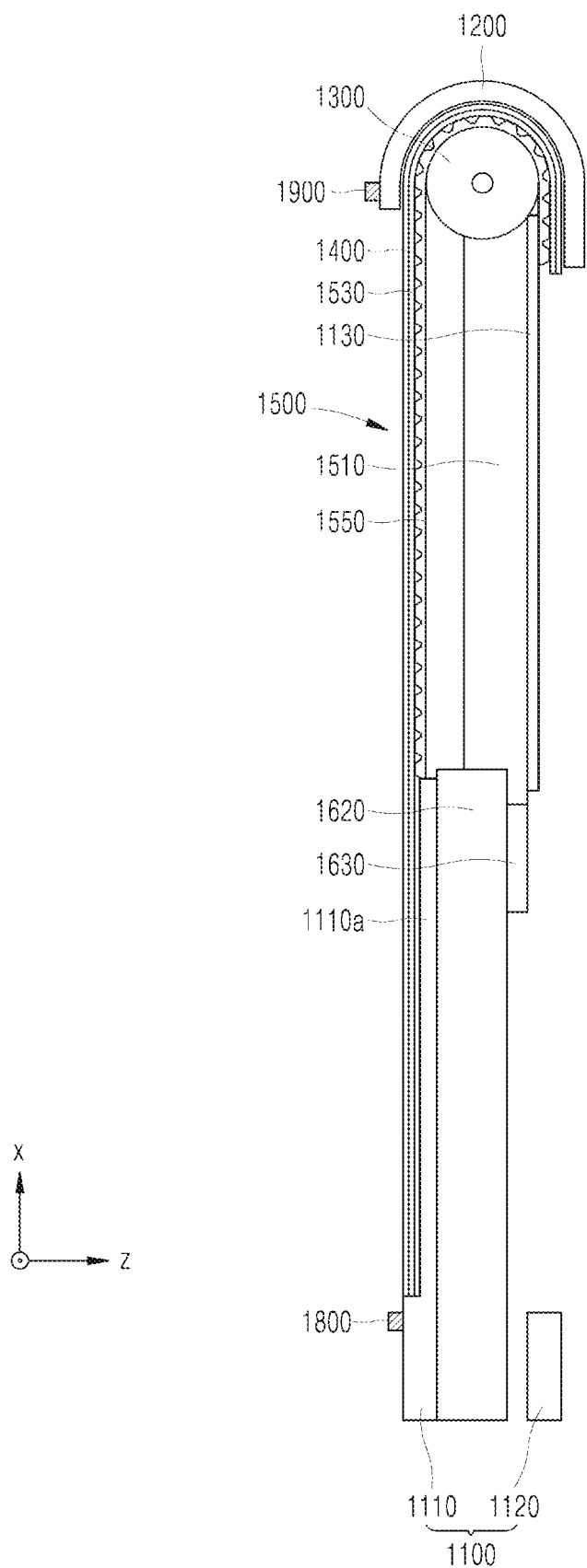
FIG. 8 is a side view of FIG. 7.

FIG. 7 is a front view showing the vehicle display device in a state different from the state in FIG. 4. FIG. 8 is a side view of FIG. 7.

The flexible display 1400 may be configured such that the externally exposed area of the front surface thereof increases in accordance with the distance between the first frame 1100 and the roller 1300 increasing. In this case, the externally exposed area of the flexible display 1400 may be defined as an area of the portion of the flexible display 1400 that is exposed to the outside of the dashboard 10 so as to be visible to a driver or a passenger in the vehicle.

FIGS. 2, 4, and 5 may illustrate an example state in which the externally exposed area of the flexible display 1400 is relatively small. FIGS. 3, 7, and 8 may illustrate another example state in which the externally exposed area of the flexible display 1400 is relatively large.

When the roller 1300 moves in the first direction from the state shown in FIG. 5, the distance between the first frame 1100 and the roller 1300 may increase, and the state of the vehicle display device may thus change to the state shown in FIG. 8. In this case, since one end portion of the flexible display 1400 is secured to the first frame 1100, which does not move in the first direction, the portion of the flexible display 1400 that is secured to the first frame 1100 does not move in the first direction.

As the roller 1300 moves upwards in the first direction away from the first frame 1100, the portion of the flexible display 1400 that is not secured to the first frame 1100 may be spread flat after partially passing through the section in which the flexible display 1400 is bent by the roller 1300.

Due to this structure, when the roller 1300 moves in the first direction and the distance between the first frame 1100 and the roller 1300 increases, the externally exposed area of the flexible display 1400 may increase.

In other words, when the roller 1300 moves in the first direction away from the first frame 1100, the flexible display 1400 may change from the first state to the second state. Conversely, when the roller 1300 moves in the first direction close to the first frame 1100, the flexible display 1400 may change from the second state to the first state.

For example, FIGS. 2, 4 and 5 illustrate the flexible display 1400 in the first state, and FIGS. 3, 7 and 8 illustrate the flexible display 1400 in the second state.

Referring to the drawings, the externally exposed area of the front surface of the flexible display 1400 in the second state may be greater than that of the front surface of the flexible display 1400 in the first state.

Therefore, due to the above-described structure, when the distance between the first frame 1100 and the roller 1300 in the first direction decreases, the externally exposed area of the flexible display 1400 may decrease, and when the distance between the first frame 1100 and the roller 1300 in the first direction increases, the externally exposed area of the flexible display 1400 may increase.

The vehicle display device may further include a moving assembly 1500 and an actuator 1600. The moving assembly 1500 may serve to move the roller 1300 in the first direction. The actuator 1600 may provide driving force to the moving assembly 1500. For example, the moving assembly 1500 may include one or more plates or one or more chains. The actuator 1600 may include a motor (e.g., a linear motor).

The moving assembly 1500 may include a moving plate 1510 and a support bar 1550. In some implementations, a chain 1520 may be used in place of the support bar 1550. The support bar 1550 will be described first, and the chain 1520 will be described later with reference to a separate drawing.

The moving plate 1510 may be formed of a solid material, and one end portion thereof may be fixedly coupled to the second frame 1200. When the roller 1300 moves in the first direction, the moving plate 1510 may also move in the first direction together therewith.

Since the roller 1300 moves in the first direction together with the second frame 1200, the moving plate 1510 may also move in the first direction according to the movement of the second frame 1200 in the first direction.

The support bar 1550 may be coupled at a portion thereof to the first frame 1100. For example, one end of the support bar 1550 and the upper end of the extension frame 1110a of the first frame 1100 may face each other, and may be coupled to each other using an adhesive. The support bar 1550 may have a plate shape overall when spread, however may be bent by the roller 1300.

When the moving plate 1510 moves in the first direction, the support bar 1550 may move in the state in which a portion thereof is wound around the roller 1300. As shown in FIGS. 5 and 8, when the roller 1300 moves away from the first frame 1100, the support bar 1550 may move in the first direction close to the roller 1300, may be bent by the roller 1300 such that the moving direction thereof is reversed 180 degrees, and may move in the first direction away from the roller 1300.

Further, the support bar 1550 may be configured to support at least a portion of the rear surface of the flexible display 1400. Referring to FIG. 8, the support bar 1550 may support the rear surface of the flexible display 1400 within the range of the roller 1300 to the portion of the support bar 1550 that is coupled to the extension frame 1110a.

Due to this structure, a portion of the flexible display 1400, for example, the planar portion thereof, may be in close contact with the extension frame 1110a or the support bar 1550.

Similarly, when the chain 1520 is provided in place of the support bar 1550, a portion of the flexible display 1400 may be in close contact with the extension frame 1110a or the chain 1520.

The support bar 1550 may be formed of a flexible material so as to be bendable, and may include a base 1551 and a support portion 1552. The base 1551 and the support portion 1552 may be integrally formed to each other. In some implementations, the support portion 1552 may be attached to the base 1551 so as to form the support bar 1550. In this case, the base 1551 and the support portion 1552 may be formed of the same material as each other.

The support bar 1550 may be connected at the base 1551 thereof to the roller 1300. The support portion 1552 may be formed in the shape of a bar that has a trapezoidal cross-section and extends in a direction perpendicular to the first direction (refer to FIG. 5).

In some implementations, a plurality of the support portion 1552 may be provided, and the plurality of the support portions 1552 may be disposed at regular intervals in the direction in which the support bar 1550 moves. For instance, each support portion 1552 may have a trapezoidal cross-section so as to avoid interference between adjacent support portions 1552 when the support bar 1550 is wound around the roller 1300 and bent thereby.

In some implementations, the moving assembly 1500 may further include the backplate 1530. The backplate 1530 may be disposed so as to face the flexible display 1400, and at least a portion of the backplate 1530 may be formed as an elastic metal plate.

The flexible display 1400 may be easily curved or bent. In some implementations, the backplate 1530 may be provided so as to be in close contact with the rear surface of the flexible display 1400. Accordingly, the backplate 1530 may support the flexible display 1400 so as to secure a planar surface of the flexible display 1400, which is not curved or bent. As a result, the flexible display 1400 may provide a high-quality image to the driver or others users.

Referring to FIGS. 5 and 8, the backplate 1530 may have a size and a shape corresponding to those of the flexible display 1400. The backplate 1530 may be coupled to the flexible display 1400 so as to be integrally movable with the flexible display 1400. The concrete structure of the backplate 1530 will be described in detail later with reference to the drawings.

Referring to FIGS. 5 and 8, the vehicle display device may further include a Hall sensor 1800 and a second magnet 1900. The Hall sensor 1800 may be secured to the first frame 1100. The second magnet 1900 may be secured to the second frame 1200. Accordingly, the Hall sensor 1800 may remain stationary, and the second magnet 1900 may move in the first direction together with the second frame 1200. The Hall sensor 1800 may be connected to the controller 180.

The Hall sensor 1800 may sense the spacing distance to the second magnet 1900, thus enabling the controller 180 included in the vehicle display device to determine the externally exposed area of the flexible display 1400.

In some examples, when the second magnet 1900 moves in the first direction, the Hall sensor 1800 may sense a change in the magnetic field caused by the second magnet 1900, and the controller 180 may determine, based thereon, the distance between the Hall sensor 1800 and the second magnet 1900 in the first direction. Further, the controller 180 may determine the externally exposed area of the flexible display 1400 based on the distance between the Hall sensor 1800 and the second magnet 1900 in the first direction.

Figure 9:
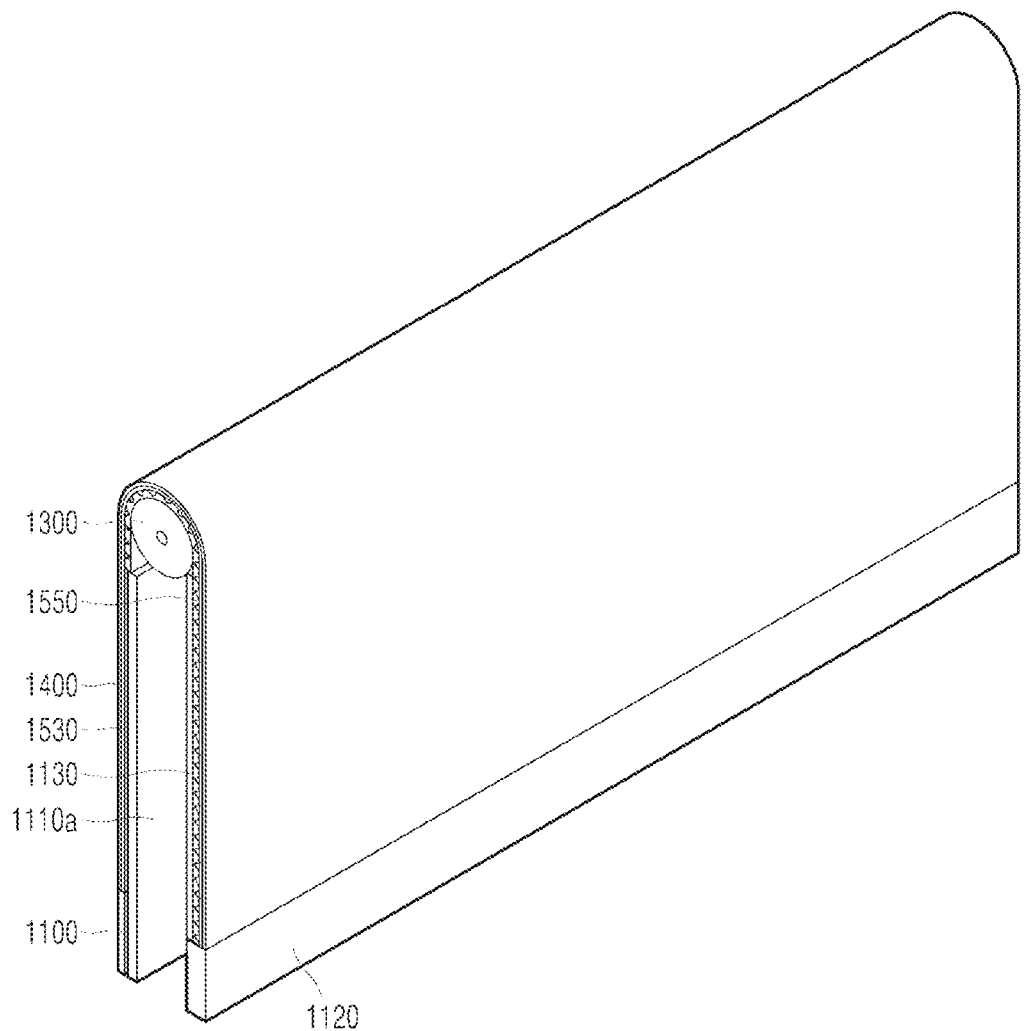
FIG. 9 is a perspective view showing example components of the vehicle display device in an example state.
Figure 10:
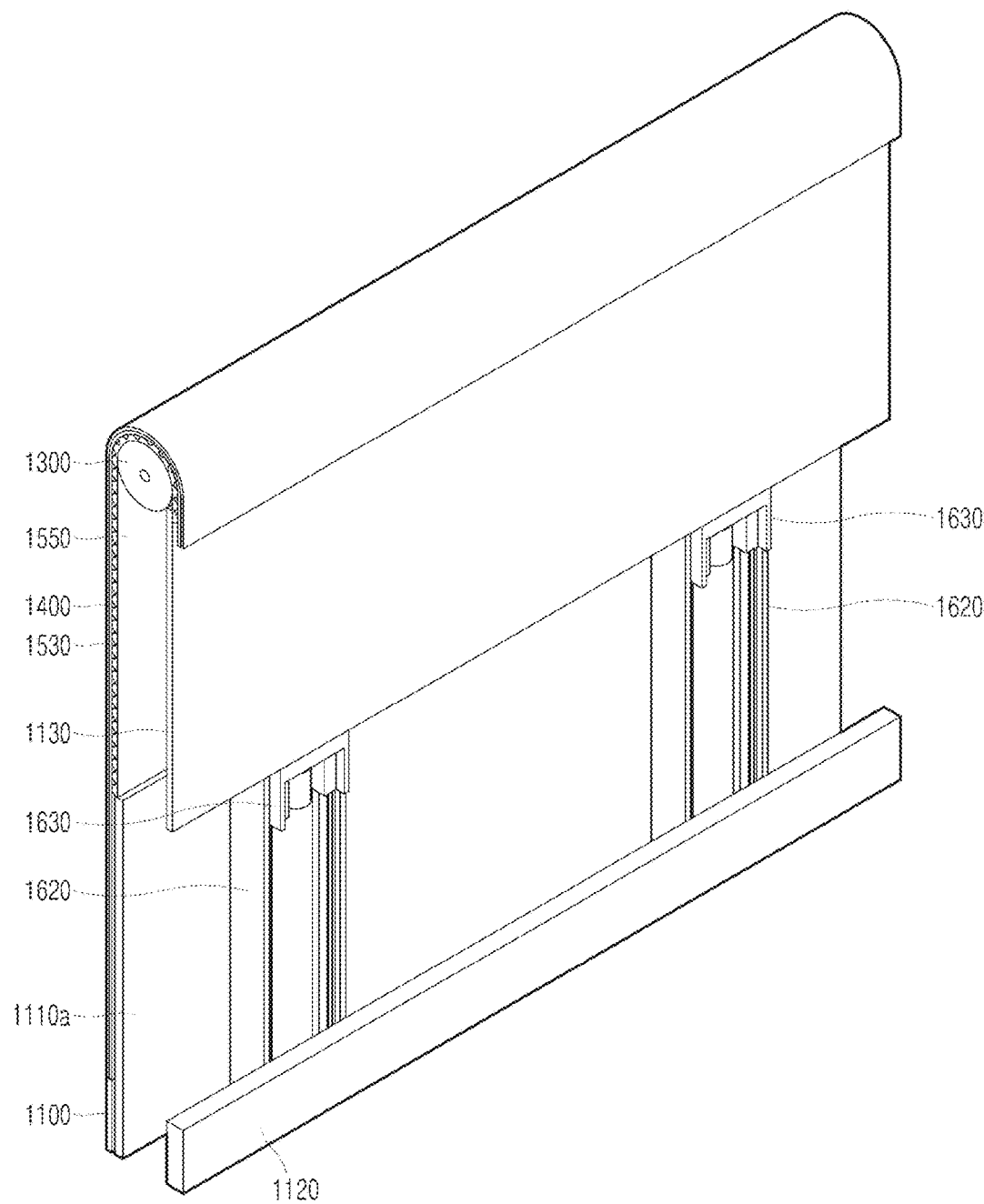
FIG. 10 is a perspective view showing the vehicle display device in another example state different from the state in FIG. 9.
Figure 11:
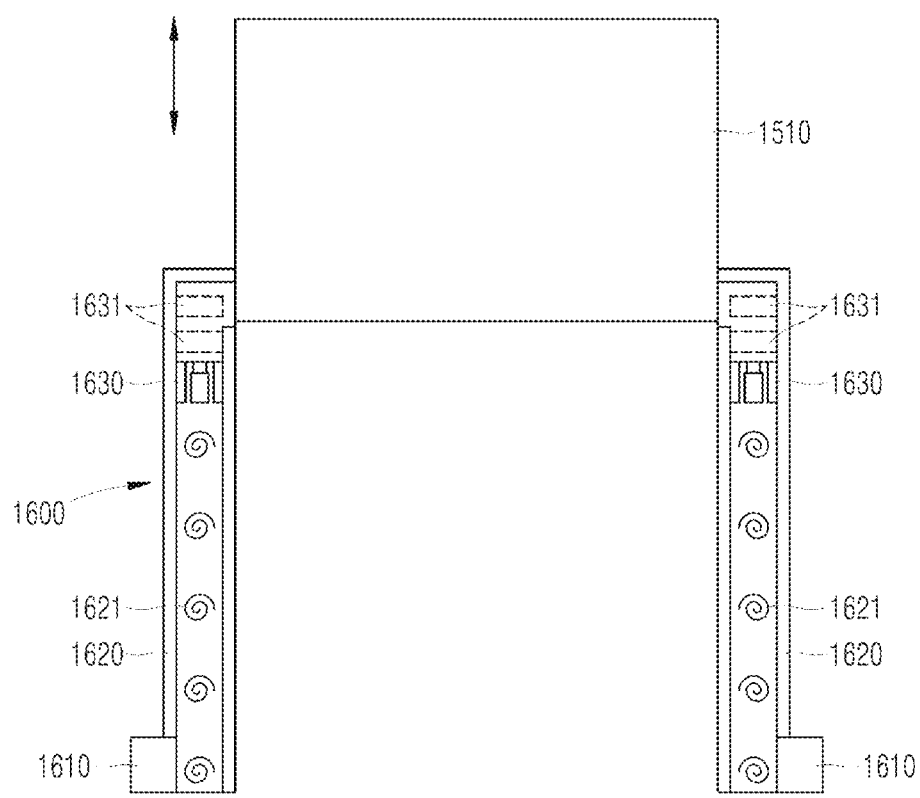
FIG. 11 is a view illustrating an example of an actuator.

FIG. 9 is a perspective view showing example components of the vehicle display device. FIG. 10 is a perspective view showing the vehicle display device in a state different from the state in FIG. 9. An illustration of some of the components of the vehicle display device is omitted from FIGS. 9 and 10 for clarity of description. FIG. 11 is a view showing an example actuator 1600.

In some examples, the actuator 1600 may be implemented as a linear motor. However, the disclosure is not limited thereto. In the same or other examples, the actuator 1600 may include a driving device, a rack gear provided at the driving device, and a rack gear formed at the moving plate 1510 so as to interlock with the rack gear of the driving device.

Hereinafter, the detailed structure of the actuator 1600, which is implemented as the linear motor, will be described with reference to FIGS. 10 and 11. The actuator 1600 may include a first bracket 1610, a second bracket 1620, and a third bracket 1630.

The first bracket 1610 may be coupled to the first frame 1100. The first bracket 1610 may be integrally formed with the second bracket 1620, or may be separately provided so as to be firmly coupled to the second bracket 1620. The first bracket 1610 may serve to couple the second bracket 1620 to the front frame 1110 of the first frame 1100.

The first bracket 1610 may be coupled to the front frame 1110 using an adhesive or an appropriate fastening mechanism. The second bracket 1620 may be provided as a pair, and accordingly, the first bracket 1610 may also be provided as a pair so as to be capable of being coupled to the pair of second brackets 1620.

The second bracket 1620 may be coupled to the first bracket 1610, and may be disposed such that the longitudinal direction thereof is oriented in the first direction. The second bracket 1620 may take on a bar shape, and may include a rail that extends in the longitudinal direction thereof in order to guide movement of the third bracket 1630. The third bracket 1630 may be mounted in the rail formed in the second bracket 1620, and may move along the rail in the first direction.

In some implementations, the second bracket 1620 may be provided as a pair. Accordingly, the third bracket 1630 may also be provided as a pair so as to be mounted in the pair of second brackets 1620, respectively.

The third bracket 1630 may be coupled to the moving plate 1510, and may be move in the first direction with respect to the second bracket 1620. As shown in FIG. 11, the third bracket 1630 may be provided as a pair so as to be coupled to the lower end portions of opposite sides of the moving plate 1510, respectively. In this case, the third bracket 1630 may be fixedly coupled to the moving plate 1510.

The third bracket 1630 may be mounted in the rail provided in the second bracket 1620, and may be move in the first direction with respect to the second bracket 1620. When the third bracket 1630 moves in the first direction, the moving plate 1510, to which the third bracket 1630 is secured, may also move in the first direction together therewith.

When the moving plate 1510 moves in the first direction, the second frame 1200 and the roller 1300 may also move in the first direction together therewith, and accordingly, the externally exposed area of the flexible display 1400 may increase or decrease.

In order to allow the third bracket 1630 to move in the first direction with respect to the second bracket 1620, a coil 1621 and a third magnet 1631 may be provided. The coil 1621 may be provided in the second bracket 1620, and the third magnet 1631 may be provided in the third bracket 1630.

In some implementations, a plurality of the coils 1621 may be provided inside the second bracket 1620, and the plurality of the coils 1621 may be disposed at predetermined intervals in the first direction, and may be configured to receive power. A plurality of the third magnet 1631 may be provided inside the third bracket 1630, and the plurality of the third magnets 1631 may be disposed at predetermined intervals in the first direction so as to be opposite the coils 1621.

For example, when current flows through the coil 1621, the third bracket 1630 may be forced to move linearly by the magnetic field formed by the third magnet 1631. Accordingly, the third bracket 1630 may move in the first direction.

The moving distance of the third bracket 1630 in the first direction may be set to be the same as the moving distance of the roller 1300 in the first direction. Since the third bracket 1630 and the second frame 1200 are secured to the moving plate 1510 and the roller 1300 moves in the first direction together with the second frame 1200, the roller 1300 may also move in the first direction the same distance that the third bracket 1630 moves in the first direction.

In some implementations, the controller 180 may control the moving direction and the moving distance of the third bracket 1630, thereby controlling the moving direction and the moving distance of the roller 1300 and accordingly effectively controlling the size of the externally exposed area of the flexible display 1400.

Referring to FIGS. 8 and 10, the vehicle display device may further include a guide plate 1130. The guide plate 1130 may be formed of a solid material that does not deform and may be fixedly coupled to the rear surface of the moving plate 1510 so as to be movable in the first direction together with the moving plate 1510.

The guide plate 1130 may restrict the open end-portion of the flexible display 1400 or the backplate 1530 from being drawn into the interior of the vehicle display device, that is, into the space in which the actuator 1600 is disposed, thereby preventing or reducing damage to the flexible display 1400 or the backplate 1530.

In some examples, the width of the guide plate 1130 may be set to be greater than the width of the moving plate 1510 and to be equal to or greater than the width of the flexible display 1400 or the width of the backplate 1530.

In some examples, the upper end of the guide plate 1130 may be disposed adjacent to the roller 1300. The lower end of the guide plate 1130 may be disposed adjacent to the rear frame 1120 when the externally exposed area of the flexible display 1400 is smallest. The height of the guide plate 1130, that is, the length thereof in the first direction, may be set appropriately.

Figure 12:
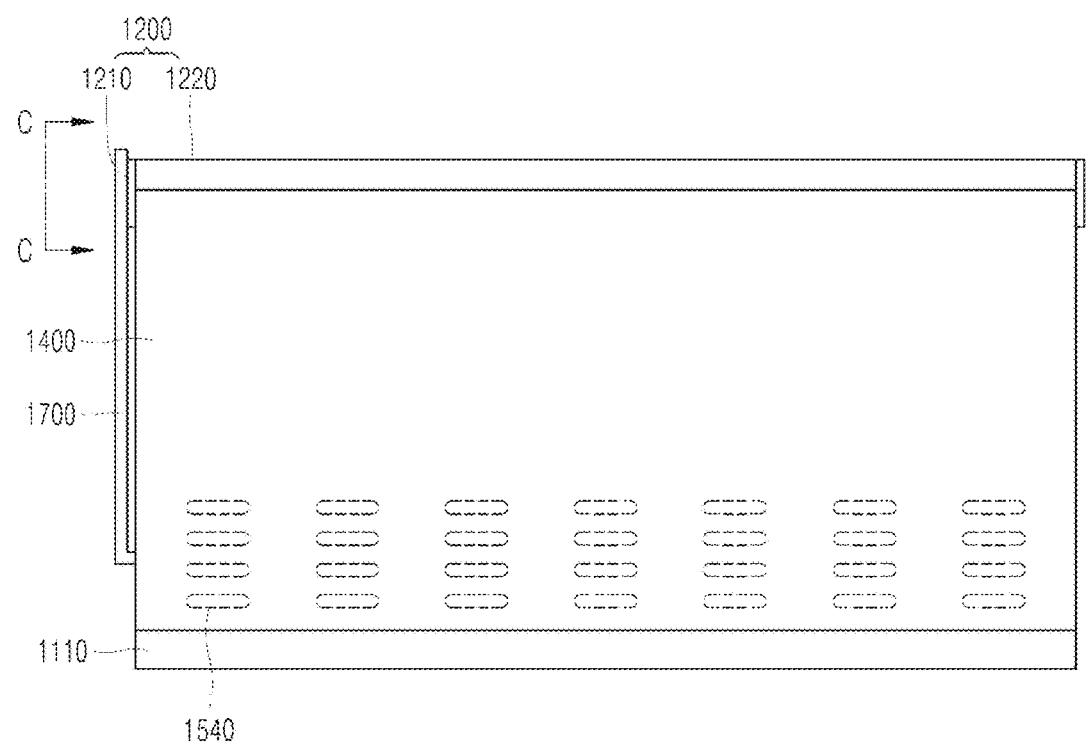
FIG. 12 is a front view showing an example of a vehicle display device.
Figure 13:
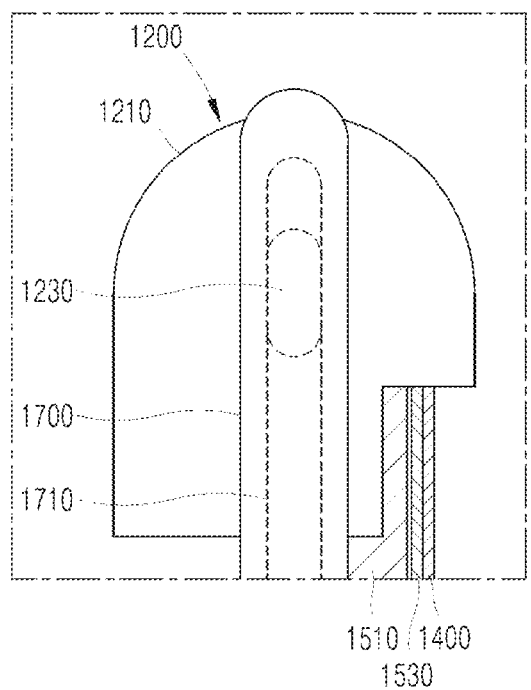
FIG. 13 is a side view showing a portion CC in FIG. 12.

FIG. 12 is a front view showing an example of a vehicle display device. FIG. 13 is a view of a portion CC in FIG. 12 when viewed from the direction indicated in FIG. 12. The vehicle display device may further include a guide bar 1700.

The guide bar 1700 may be secured to the first frame 1100, for example, to the front frame 1110, and may be disposed such that the longitudinal direction thereof is oriented in the first direction. The guide bar 1700 may include a guide rail 1710 to which a protruding portion 1230 of the second frame 1200 is coupled.

Due to the above-described structure, the second frame 1200 and the roller 1300 may be guided by the guide bar 1700 to move in the first direction. The guide bar 1700 may be formed of a solid material, and a portion thereof may be secured to the first frame 1100, thereby stably supporting the movement of the second frame 1200 and the roller 1300 in the first direction.

In some implementations, the movement of the second frame 1200 and the roller 1300 in the first direction is stably supported by the guide bar 1700, which may prevent or reduce wrinkling of the flexible display 1400 or damage thereto and may also prevent or reduce damage to the vehicle display device or malfunction thereof, which may occur, for example, if the second frame 1200 and the roller 1300 unstably move in the first direction.

The vehicle display device may further include a first magnet 1540. The first magnet 1540 may be disposed on a portion of the flexible display 1400 in order to couple the flexible display 1400 to the backplate 1530.

As shown in FIG. 12, a plurality of the first magnets 1540 may be provided. The number of first magnets 1540 may be set appropriately such that the first magnets 1540 are arranged horizontally and vertically on a portion of the flexible display 1400. In some examples, the first magnets 1540 may be disposed on the portion of the flexible display 1400 that is not bent by the roller 1300.

The first magnet 1540 may be attached to, for example, the rear surface of the flexible display 1400, that is, the surface of the flexible display 1400 that faces the backplate 1530, using an adhesive.

In some implementations, the flexible display 1400 and the backplate 1530 may be securely coupled to each other by the first magnet 1540, which may help to prevent the backplate 1530 from being pushed against the flexible display 1400 due to repeated movement of the flexible display 1400.

Figure 14:
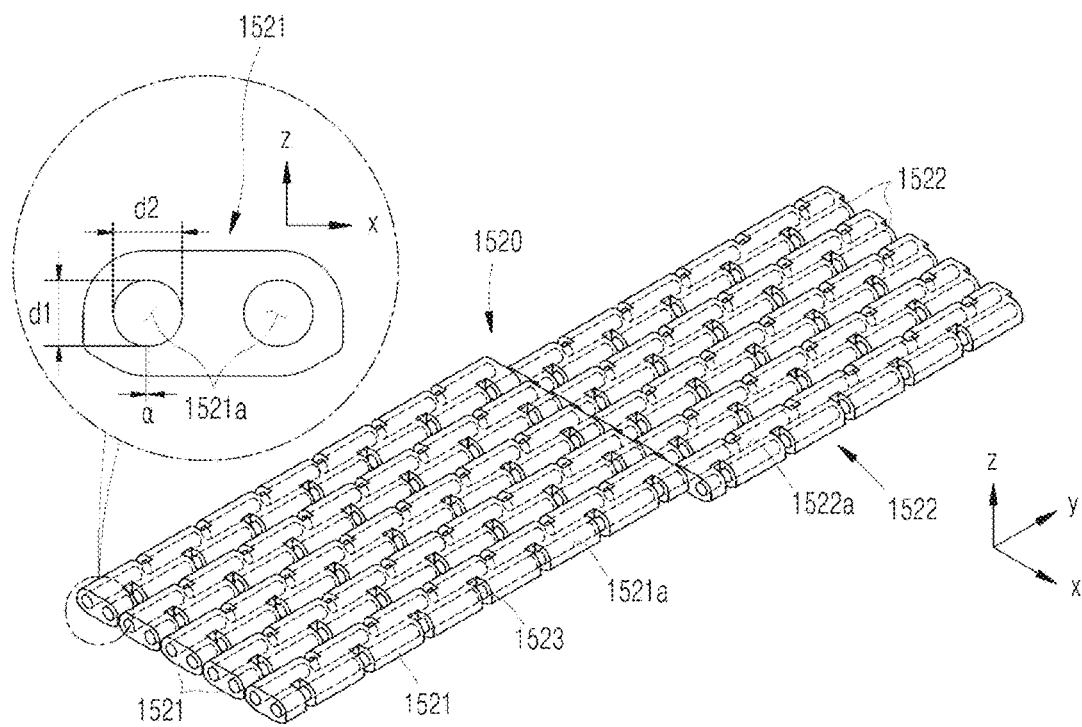
FIG. 14 is a perspective view showing an example chain.
Figure 15:
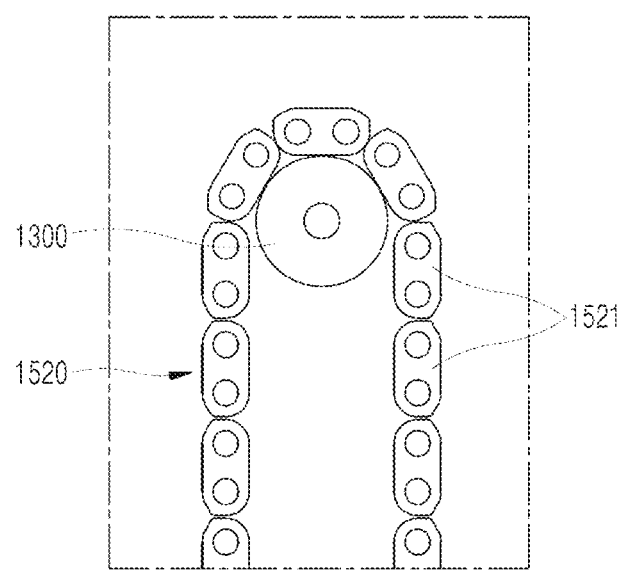
FIG. 15 is a view illustrating an example of operation of the chain.

FIG. 14 is a perspective view showing an example chain 1520. FIG. 15 is a view showing an example of operation of the chain 1520.

As described above, the chain 1520 may be provided in place of the support bar 1550, and may serve the same role as the support bar 1550. That is, a portion of the chain 1520 may be coupled to the first frame 1100, for example, the extension frame 1110a. Further, the chain 1520 may be bent by the roller 1300, and may support at least a portion of the rear surface of the flexible display 1400.

The chain 1520 may be formed of, for example, a metal material. The chain 1520 may be provided at one end portion thereof with, for example, a pin. The pin may be fitted into the extension frame 1110a so that the chain 1520 and the extension frame 1110a are coupled to each other. However, the coupling method is not limited thereto.

Since the structure of the support bar 1550 has been described above, duplicate descriptions of the chain 1520 and the support bar 1550 are omitted, and the unique structure of the chain 1520 will be described below.

The chain 1520 may include a first link 1521, a second link 1522, and a link pin 1523. A plurality of the first links 1521 and the second links 1522 may be provided.

The plurality of the first links 1521 may be arranged in the forward-backward direction, and the plurality of the second links 1522 may also be arranged in the forward-backward direction. The first links 1521 and the second links 1522 may be connected to each other.

In order to allow the first link 1521 and the second link 1522 to be connected to each other, the first link 1521 may have a first link hole 1521a formed therein, and the second link 1522 may have a second link hole 1522a formed therein. The link pin 1523 may be fitted into the first link hole 1521a and the second link hole 1522a.

The first link 1521 and the second link 1522 may rotate relative to each other about the link pin 1523 fitted thereinto. The first link 1521 may have two identical first link holes 1521a spaced apart formed therein. The second link 1522 may have two identical second link holes 1522a spaced apart formed therein.

The link pin 1523 may be formed to have a circular cross-section, and the second link hole 1522*a* may also be formed to have a circular cross-section. The first link hole 1521*a* may have an elongated slot shape such that the diameter thereof in the longitudinal direction of the chain 1520 is relatively long. For example, the first link hole 1521*a* may have diameter d2 in the longitudinal direction of the chain 1520 that is greater than diameter d1 in the thickness direction of the chain 1520 (by the length a).

For example, the first link hole 1521*a* may be formed such that the diameter d2 in the longitudinal direction of the chain 1520 is greater than the diameter d1 in the thickness direction of the chain 1520 by 0.2 mm.

The chain 1520 (the combination of links) may be in a straight state. The chain 1520 may be also curved, for example, when the chain 1520 is bent around the roller 1300. When the chain 1520 is curved, the gaps between some of the links may increase or decrease in order to enable smooth deformation of the chain 1520. This is because the chain 1520 wound around the roller 1300 may not form a part of a complete circle (for example, a complete semicircle).

Therefore, in the vehicle display device, the first link hole 1521*a* is formed in a slot hole shape such that the diameter thereof in the longitudinal direction of the chain 1520 is relatively long, thereby enabling compensation for the length of the chain 1520.

Figure 16:
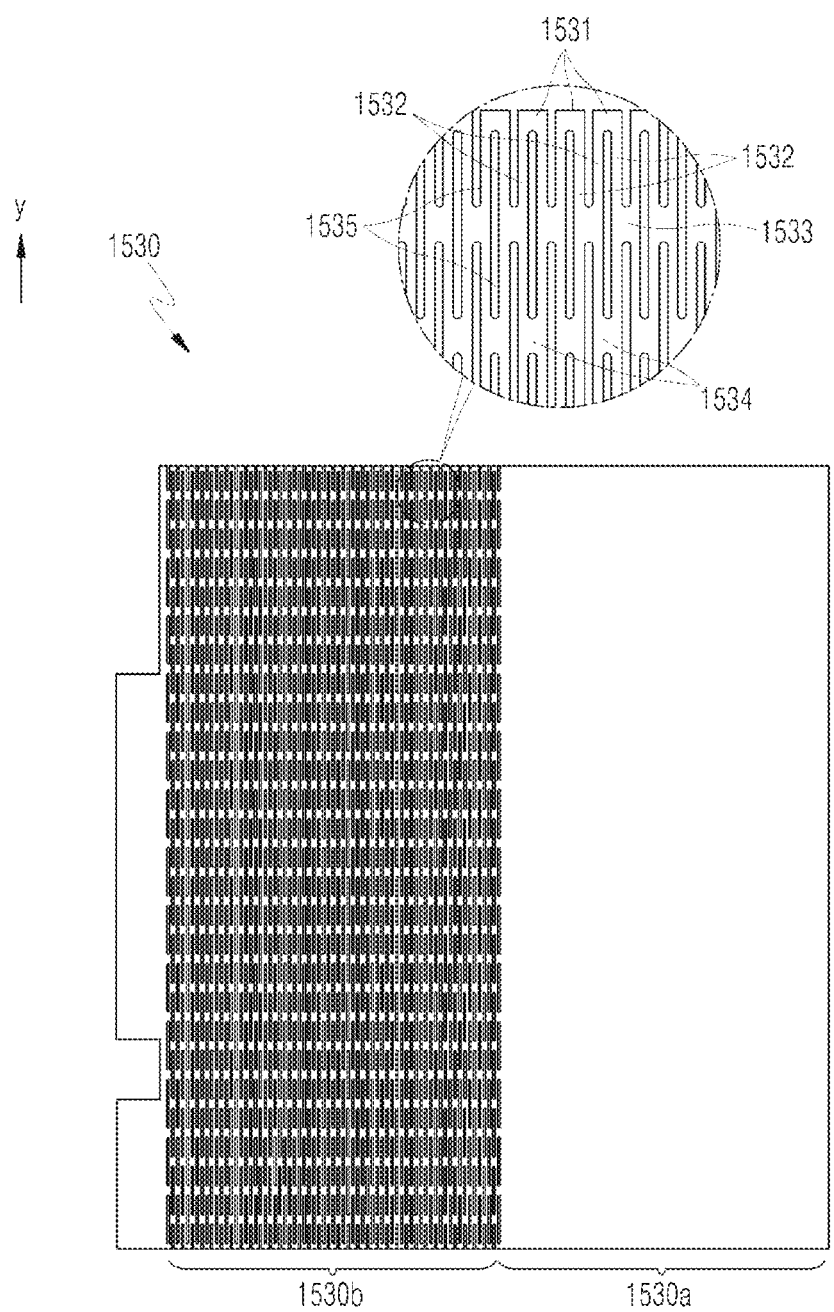
FIG. 16 is a view showing an example of a backplate.

FIG. 16 is a view showing an example backplate 1530. The backplate 1530 may be implemented as an elastic metal plate. For example, the backplate 1530 may include a superelastic metal or alloy.

The backplate 1530 may allow the flexible display 1400 to be smoothly and elastically deformed, and elastically restored.

In some implementations, the backplate 1530 may be formed as a relatively thin plate. For example, the backplate 1530 may be formed to have an arbitrary thickness within a range of 0.05 to 0.2 mm, and may be formed to have a thickness of 0.1 mm.

The backplate 1530 may be implemented as a unitary metal plate overall, and may be divided into two or more areas. Specifically, the backplate 1530 may be configured to include a fixed area 1530*a* and a transformable area 1530*b*.

The fixed area 1530*a* is an area that overlaps the portion of the flexible display 1400 that is not bent. In the fixed area 1530*a*, the backplate 1530 may be formed as a flat metal plate as a whole.

The backplate 1530 may have a through-hole 1535 that extends through a portion corresponding to the roller 1300, i.e., through the transformable area 1530*b*. The transformable area 1530*b* is an area that overlaps the portion of the flexible display 1400 that is bent. A plurality of the through-holes 1535 may be provided number, and may be formed through the transformable area 1530*b* so as to extend in the width direction (the leftward-rightward direction). That is, a plurality of the through-holes 1535 may be formed through the transformable area 1530*b* of the backplate 1530 in the thickness direction of the backplate 1530.

In the transformable area 1530*b*, the backplate 1530 may be formed to be symmetrical in the left-right direction. The transformable area 1530*b* in which the plurality of through-holes 1535 are formed may include edges 1531, horizontal connectors 1532, and first vertical connectors 1533.

The edges 1531 are divided into a plurality of edges to form a left edge and a right edge of the backplate 1530. The edges 1531 have a predetermined length along the length direction, and are spaced apart from each other.

The horizontal connectors 1532 extend from the edges 1531 in the width direction. Two horizontal connectors 1532 extend from one edge 1531.

One first vertical connector 1533 connects two horizontal connectors 1532 extending from different edges 1531. That is, one first vertical connector 1533 connects two horizontal connectors 1532 which extend from two adjacent edges 1531 and are adjacent to each other. The first vertical connectors 1533 may be repeatedly formed along the width direction (left-right direction), and the first vertical connectors 1533 may be spaced apart from each other at regular intervals.

Second vertical connectors 1534 may be formed in the transformable area 1530*b*, and one second vertical connector 1534 connects two horizontal connectors 1532 extending from the same edge 1531. The second vertical connectors 1534 may be repeatedly formed along the width direction (left-right direction), and the second vertical connectors 1534 may be spaced apart from each other at regular intervals.

As described above, since the through-holes 1535, which are long in the width direction, are repeatedly formed in the transformable area 1530*b*, the transformable area 1530*b* may be easily bent with respect to the rotation axis of the width direction.

When a tensile force, which is an external force, is applied to the transformable area 1530*b* along the length direction, the edges 1531 and the first vertical connectors 1533 may be deformed to be spaced apart from each other in the length direction with respect to the horizontal connectors 1532, and the length of the transformable area 1530*b* may be increased over the entire area of the transformable area 520*b*. When the external force is removed, the transformable area 1530*b* is elastically recovered to its original state.

Further, when tensile force, which is an external force, is applied to the transformable area 1530*b* along the length direction, the first vertical connectors 1533 and the second vertical connectors 1534 may be deformed so as to be spaced apart from each other in the length direction with respect to the horizontal connector 1532, and the length of the transformable area 1530*b* may be increased over the entire area of the transformable area 520*b*. When the external force is removed, the transformable area 1530*b* is elastically recovered to its original state.

Since the backplate 1530 includes the transformable area 1530*b*, the region of the flexible display 1400 that is bent may be more flexibly deformed. Therefore, when the flexible display 1400 is bent in a region adjacent to the roller 1300, elastic deformation of the flexible display 1400 is facilitated, and control of spring-back thereof is also facilitated.

Further, since the backplate 1530 includes the transformable area 1530*b*, the flexible display 1400 may be elastically deformed within a predetermined range along the length direction.

In some implementations, the externally exposed area of the flexible display 1400 may be automatically adjusted by the actuator 1600 to adjust the size of the screen on which image information is displayed according to the convenience of the user.

Further, the controller 180 included in the vehicle display device may control the driving of the vehicle display device such that the externally exposed area of the flexible display is adjusted based on the characteristics of each user or each device included in the vehicle.

For example, the controller 180 may control the externally exposed area of the vehicle display device based on a user input value. That is, the user inputs a numerical value corresponding to a desired externally exposed area of the vehicle display device to the input interface 120, and the controller 180 controls the externally exposed area of the vehicle display device according to the numerical value inputted by the user so that the user is capable of conveniently viewing an image or information displayed on the screen with a size desired by the user.

In addition, for example, the flexible display 1400 may reproduce a screen for control of devices included in the vehicle, and the controller 180 may cause the externally exposed area of the flexible display 1400 to vary depending on the characteristics of each device included in the vehicle.

In detail, the flexible display 1400 may reproduce a navigation screen, a screen for operation of an air-conditioner, and a screen for control of driving devices, for example, a screen on which a brake and a speedometer are displayed. In the case in which the controller 180 reproduces the navigation screen so that the user, such as the driver, is capable of, for example, conveniently and accurately recognizing the destination or the current position of the vehicle, the controller 180 may control the vehicle display device such that the externally exposed area of the flexible display 1400 increases further than any other time.

In addition, for example, the controller 180 may identify a user seated in the driver seat by recognizing the face of the user using a camera provided in the vehicle display device, and may control the size of the externally exposed area of the flexible display 1400 based on a preset value according to the identified user.

As described above in association with implementations, although some cases were described, other various implementations are possible. The technical contents of the implementations described above may be combined in various ways unless they are not compatible, so new implementations may be correspondingly implemented.

What is claimed is:

1. A display device for a vehicle, comprising:
    a first frame;
    a second frame configured to be move along a first direction with respect to the first frame;
    a roller rotatably coupled to the second frame and configured to move along the first direction based on movement of the second frame;
    a flexible display that is at least partially wound around the roller and that is configured to be bent around the roller, the flexible display having an end portion fixed to the first frame;
    a moving assembly configured to move the roller in the first direction; and
    an actuator configured to provide driving force to the moving assembly,
    wherein a front surface of the flexible display defines an externally exposed area that is configured to increase based on an increase of a distance between the first frame and the roller,
    wherein the moving assembly comprises:
        a moving plate that is coupled to the second frame and that is configured to move along the first direction based on the roller moving in the first direction, and
        a chain that is coupled to the first frame, that is configured to be bent around the roller, and that is configured to support at least a portion of a rear surface of the flexible display,
    wherein the actuator comprises:
        a first bracket coupled to the first frame,
        a second bracket that is coupled to the first bracket and that extends in the first direction, and
        a third bracket coupled to the moving plate and configured to move along the first direction with respect to the second bracket, and
    wherein the second bracket comprises a plurality of coils that are arranged along the first direction, that are spaced apart from one another by a predetermined interval in the first direction, and that are configured to receive power to move the third bracket.

2. The display device of claim 1, wherein the second frame comprises:
    a pair of bodies that are coupled to ends of the roller, respectively; and
    a connection bar that connects the pair of bodies to each other and that is configure to guide the flexible display in contact with the roller.

3. The display device of claim 1, wherein the chain comprises:
    a first link that defines a first link hole;
    a second link that defines a second link hole; and
    a link pin that is inserted into the first link hole and the second link hole and that connects the first link and the second link to each other, and
    wherein the first link hole has an elongated slot shape having a first diameter in a longitudinal direction of the chain and a second diameter in a thickness direction of the chain, the first diameter being greater than the second diameter.

4. The display device of claim 1, wherein the moving assembly further comprises:
    a backplate that faces the flexible display and that defines a through-hole at a position corresponding to the roller, at least a portion of the backplate comprising an elastic metal plate.

5. The display device of claim 4, further comprising a first magnet that is disposed at a portion of the flexible display and that couples the flexible display to the backplate.

6. The display device of claim 1, wherein the chain has an end portion fixed to the first frame.

7. The display device of claim 1, wherein the actuator comprises a linear motor.

8. The display device of claim 1, wherein the third bracket comprises a plurality of magnets that are configured to face the plurality of coils and that are arranged along the first direction, and that are spaced apart from one another by a predetermined interval in the first direction.

9. The display device of claim 1, wherein the roller is configured to move by a distance in the first direction based on the third bracket moving by the distance in the first direction.

10. The display device of claim 1, wherein the first frame is fixed to a dashboard of the vehicle, and
    wherein the flexible display is configured to protrude outward from the dashboard of the vehicle based on the second frame moving along the first direction with respect to the first frame.

11. The display device of claim 1, further comprising a guide bar that is coupled to the first frame and that extends in the first direction, the guide bar defining a guide rail that receives a protruding portion of the second frame.

12. The display device of claim 1, further comprising:
    a magnet coupled to the second frame; and
    a Hall sensor that is coupled to the first frame, that is configured to sense a spacing distance relative to the magnet, and that allows a controller of the vehicle to determine the externally exposed area based on the sensed spacing distance.

13. The display device of claim 1, wherein the display device is configured to be controlled by a controller of the vehicle to thereby change the externally exposed area according to a user or a device in the vehicle.

* * * * *